Figure 1:
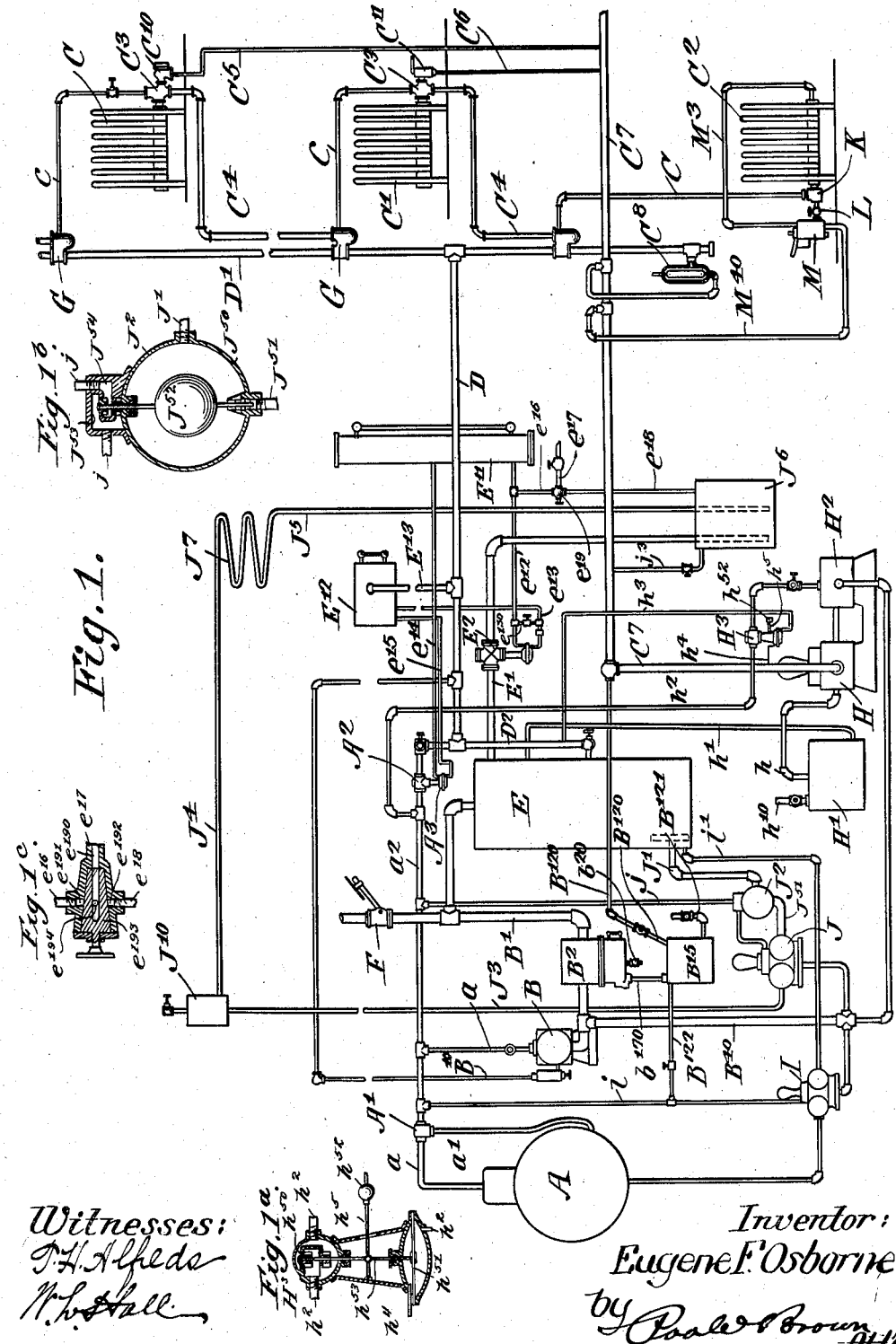

No. 894,897. PATENTED AUG. 4, 1908.
E. F. OSBORNE.
COMBINED STEAM POWER AND HEATING APPARATUS.
APPLICATION FILED NOV. 23, 1903.
12 SHEETS—SHEET 3.

Witnesses:

Inventor:
Eugene F. Osborne
by Poole Brown
Attys.

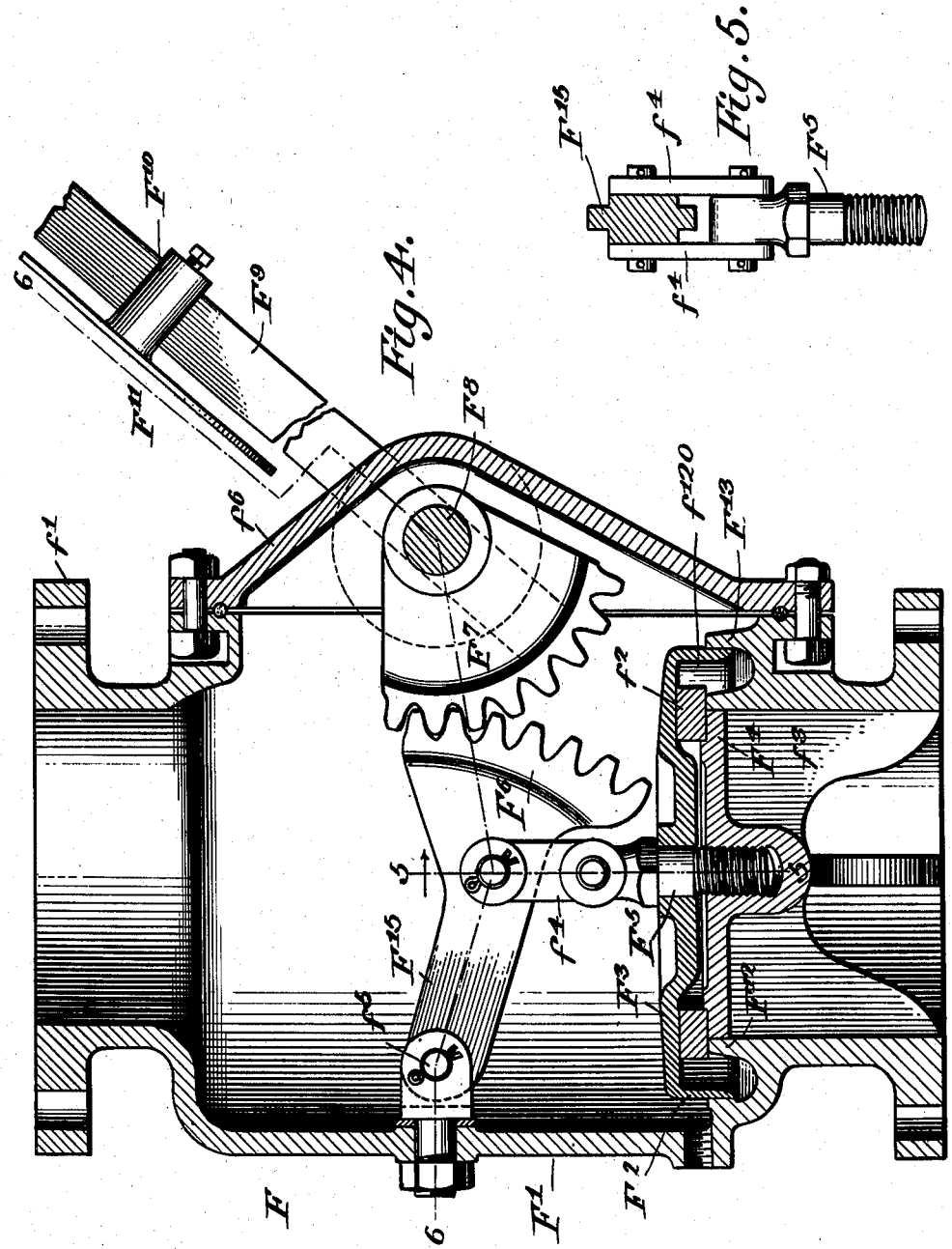

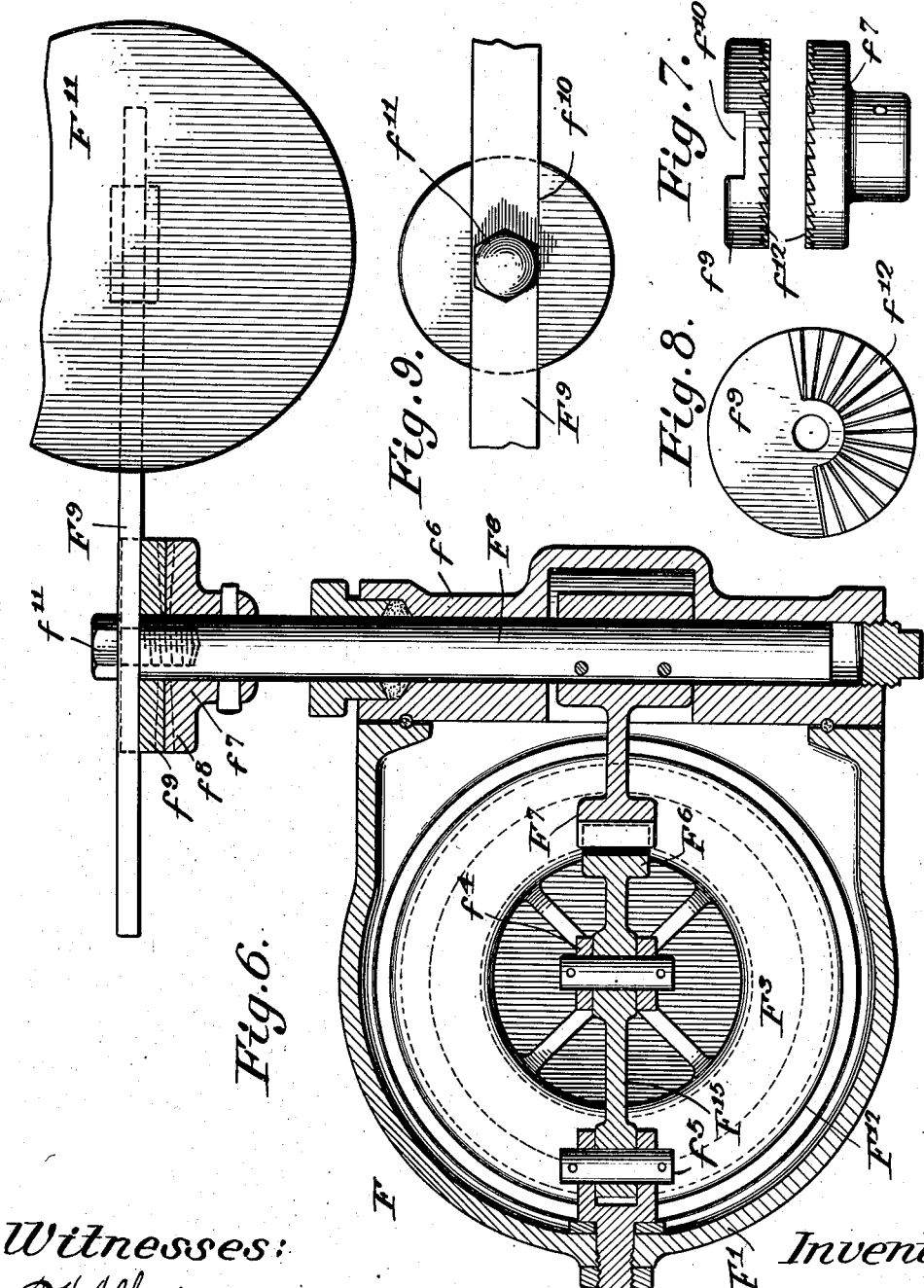

No. 894,897. PATENTED AUG. 4, 1908.
E. F. OSBORNE.
COMBINED STEAM POWER AND HEATING APPARATUS.
APPLICATION FILED NOV. 23, 1903.
12 SHEETS—SHEET 6.
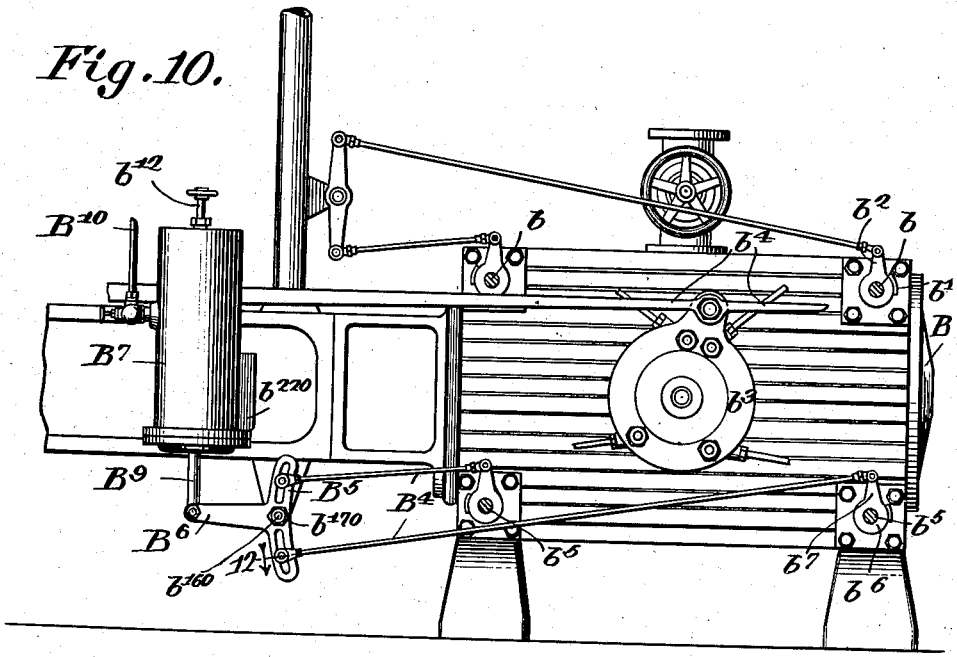
Fig. 10.
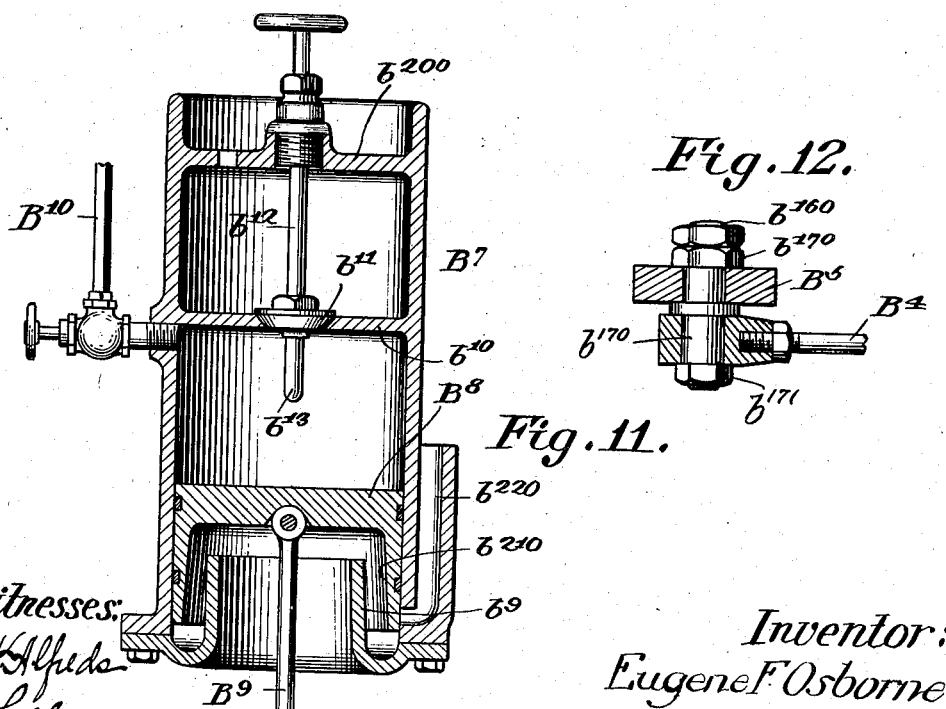
Fig. 11.
Fig. 12.
Witnesses:
Inventor:
Eugene F. Osborne
by Rob W Brown
Attys.

No. 894,897.  
E. F. OSBORNE.  
COMBINED STEAM POWER AND HEATING APPARATUS.  
APPLICATION FILED NOV. 23, 1903.  
PATENTED AUG. 4, 1908.  
12 SHEETS—SHEET 7.

Witnesses:  
Inventor:  
Eugene F. Osborne  
by Poole & Brown  
Attys.

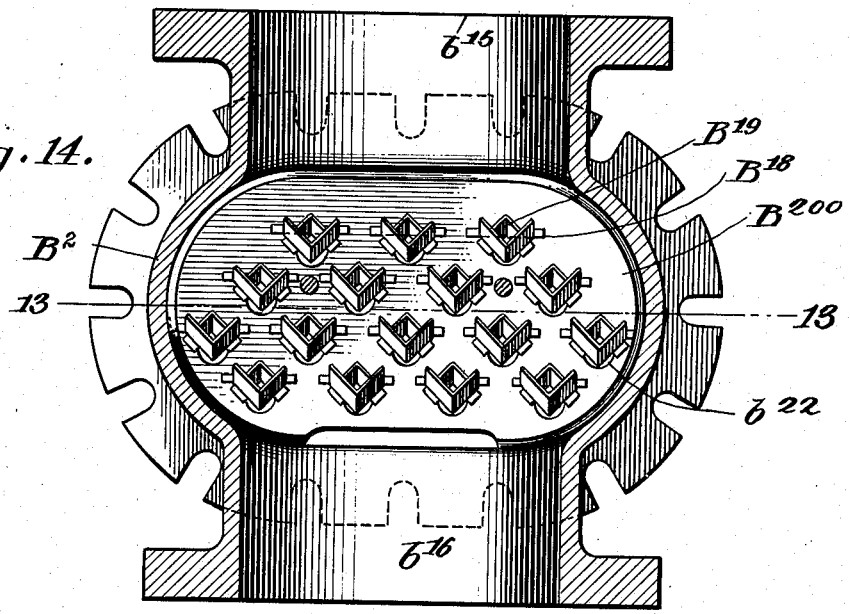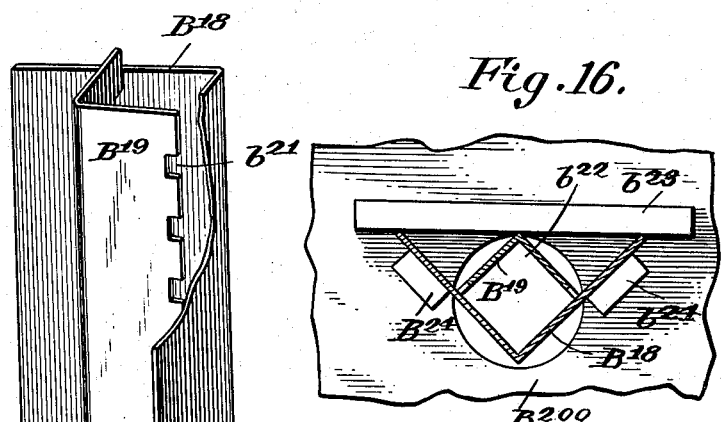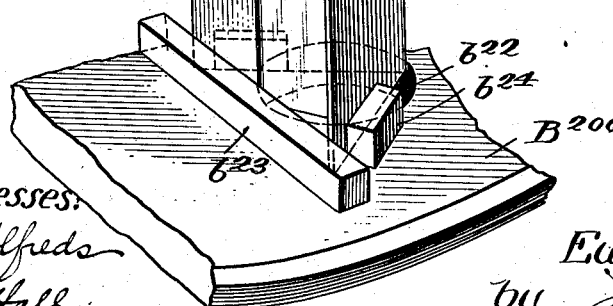

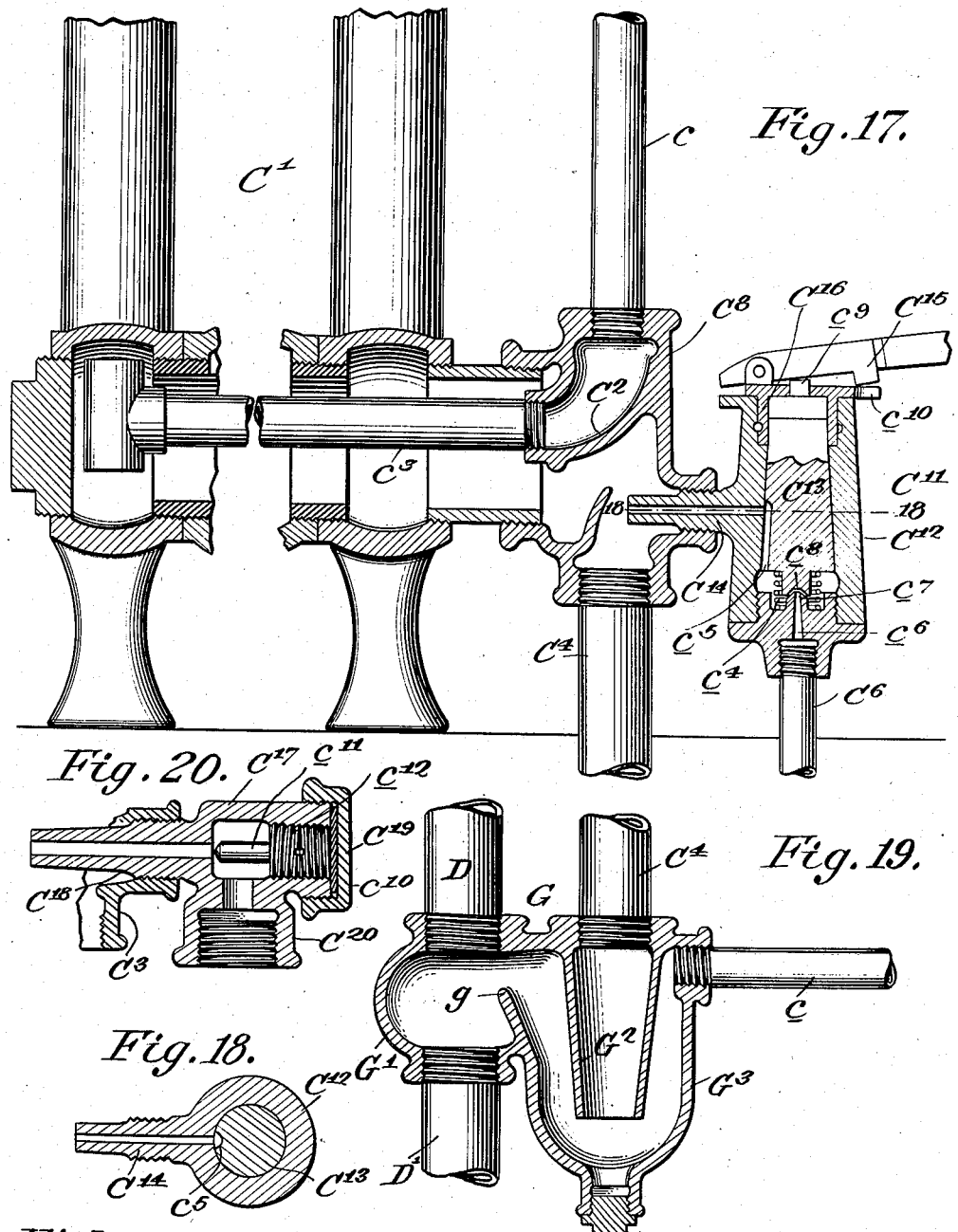

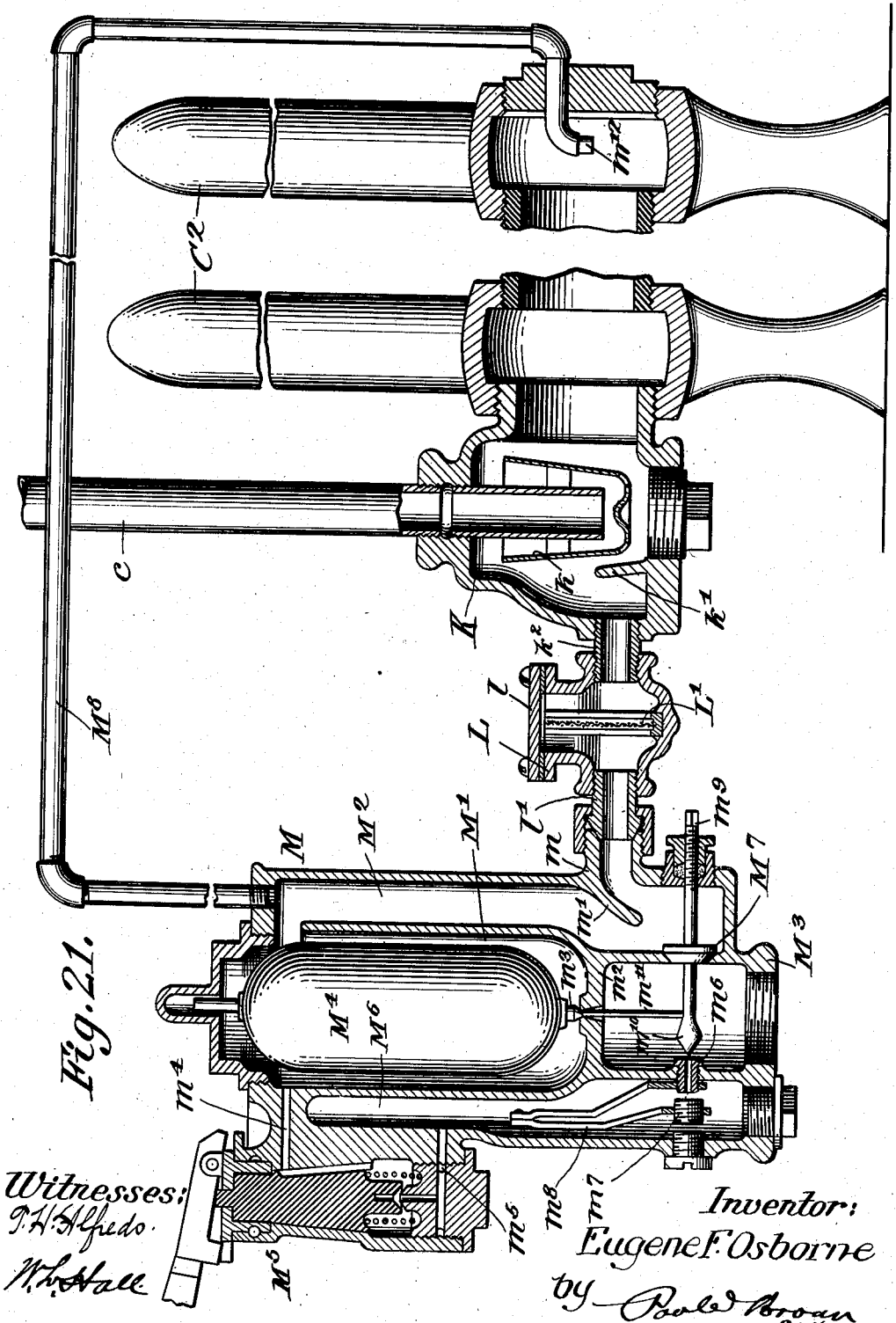

No. 894,897. PATENTED AUG. 4, 1908.
E. F. OSBORNE.
COMBINED STEAM POWER AND HEATING APPARATUS.
APPLICATION FILED NOV. 23, 1903.
12 SHEETS—SHEET 11.
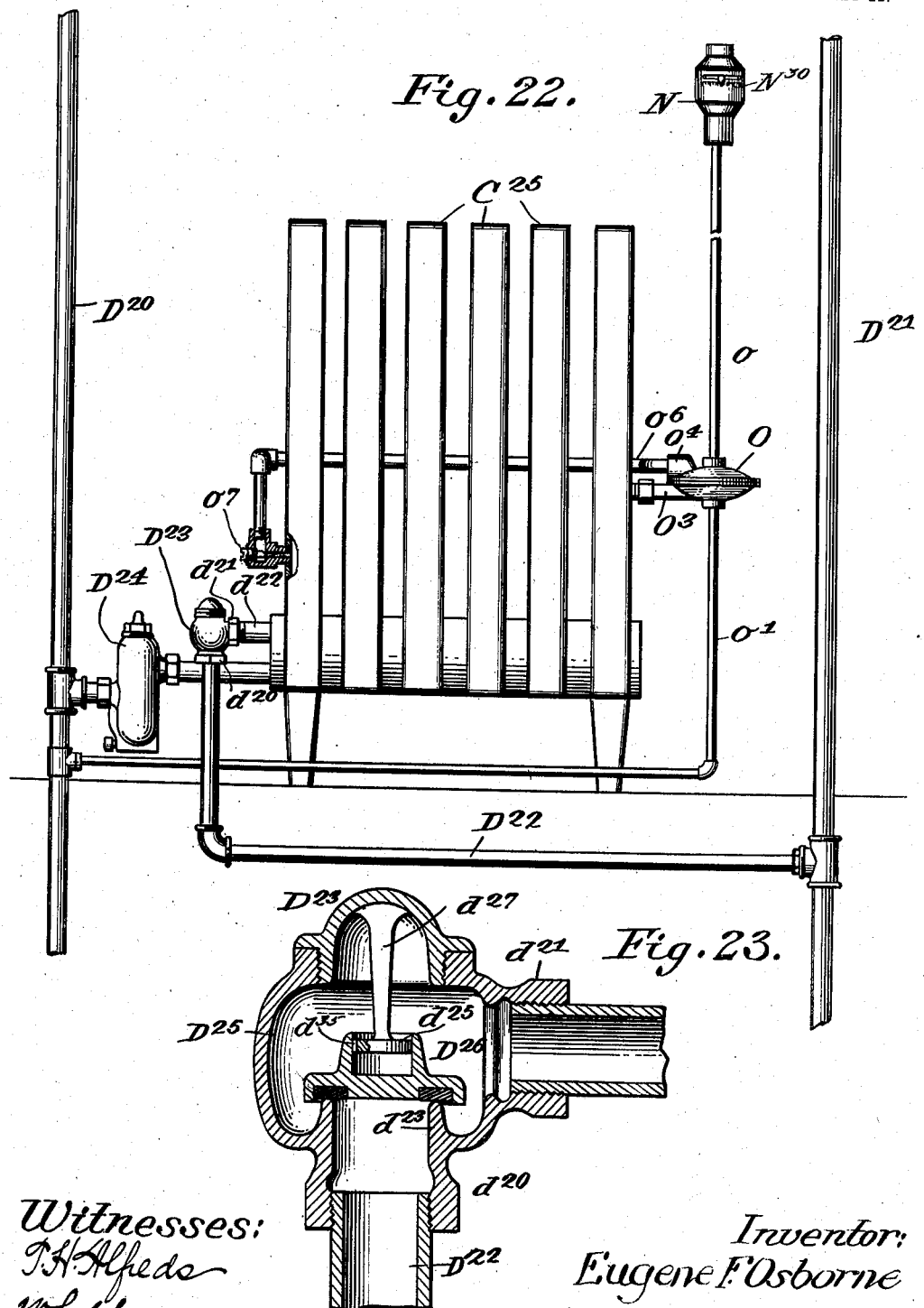
Witnesses:
Inventor:
Eugene F. Osborne
by Attys

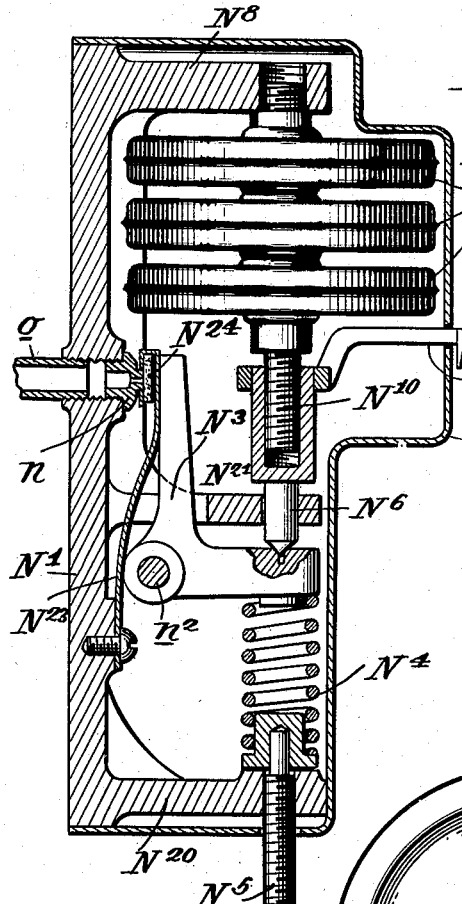
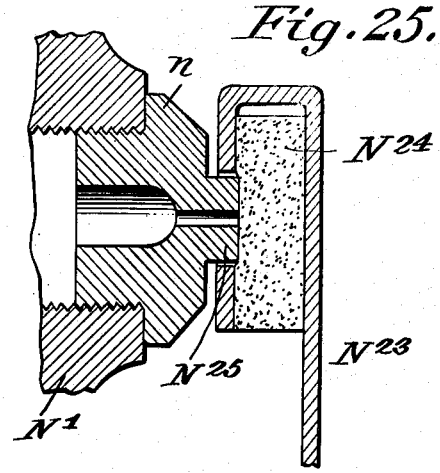
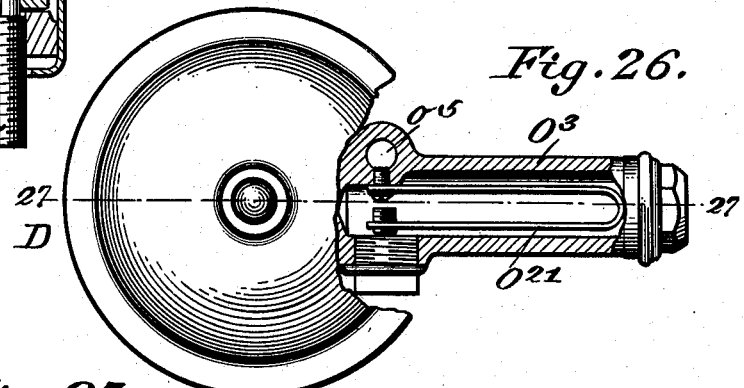
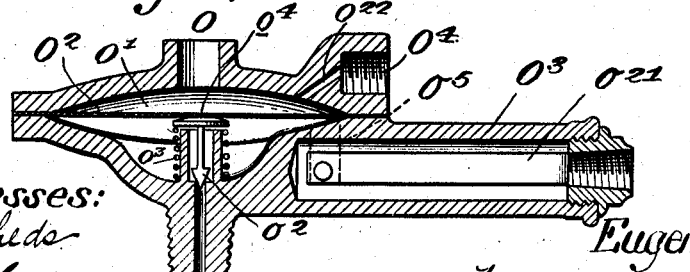

UNITED STATES PATENT OFFICE.

EUGENE F. OSBORNE, OF CHICAGO, ILLINOIS, ASSIGNOR TO OSBORNE STEAM ENGINEERING COMPANY, OF CHICAGO, ILLINOIS, A CORPORATION OF ILLINOIS.

COMBINED STEAM POWER AND HEATING APPARATUS.

No. 894,897.     Specification of Letters Patent.     Patented Aug. 4, 1908.

Application filed November 23, 1903. Serial No. 182,334.

*To all whom it may concern:*

Be it known that I, EUGENE F. OSBORNE, a citizen of the United States, of Chicago, in the county of Cook and State of Illinois, have invented certain new and useful Improvements in a Combined Steam Power and Heating Apparatus; and I do hereby declare the following is a full, clear, and exact description thereof, reference being had to the accompanying drawings, and to the letters of reference marked thereon, which form a part of this specification.

This invention relates to an improved apparatus for the utilization of the heat of steam for power and heating purposes, of that class wherein a portion of the heat of the steam is converted in a steam engine into power and applied to perform work, and a portion or all of the heat of the exhaust steam from said engine is utilized for heating purposes.

The principal object of my invention is to maintain uniformly high the efficiency of a combined power and heating plant of this character, considered with respect to the production of steam and consumption of fuel, when operating under varying conditions with respect to the load of the engine and the load on the heating system, and so constructed that when both parts of the apparatus are operating under practically their full load the maximum available heat of the exhaust steam is utilized in the heating system, and when the heating system is operating under less than its full capacity or is entirely cut off, the steam used in the engine for power purposes is used at an efficiency practically as high as may be attainable with a condensing engine.

A further object of the invention is to maintain a constant difference of pressure between the feed and return side of the system notwithstanding the absolute pressures maintained in the two sides of the system.

A still further object of the invention is to vary the time of cut-off of the exhaust closures of an engine employed in a system of this character, controlled by the conditions of back pressure in the engine, whereby the clearance spaces of the engine are always filled with exhaust steam at a substantially constant pressure and temperature.

Other objects of the invention will appear from the foregoing description and subjacent claims.

My combined power and heating system contemplates the interposition of a condenser between the engine and the heating system combined with provision for so operating the condenser that whatever exhaust steam which passes into the condenser that is not required for heating purposes is condensed therein in the manner of a usual condenser, the parts operating in such manner that a certain determined pressure and correlative temperature is maintained in the heating system so that only that portion of the exhaust steam that is not required for heating purposes shall be condensed in the condenser. To this end I propose to regulate the supply of the condensing agent to the condenser to accord with the consumption of the steam in the heating system, and conveniently such supply of the condensing agent is controlled by a throttle valve which is placed under the governing influence of the pressure in the feed side of the heating system, whereby is regulated or determined the quantity of the steam to be passed to the heating system for heating purposes and the quantity to be condensed; and such governing mechanism is so constructed that the pressure maintained in the heating system may be varied and therefore the quantity of steam condensed in the condenser correspondingly varied. These conditions are maintained so long as there is sufficient exhaust steam furnished to operate the heating system under the condition of pressure and temperature desired. If there be an insufficient quantity of exhaust steam to supply the heating system, then in that case live steam may be added, which will be introduced to the steam space of the heating system through a governing mechanism which is controlled by the conditions of pressure existing in the heating system.

My invention also contemplates in its practical adaptation an air check valve located at the terminal end of the exhaust pipe of the engine beyond its connection with the condenser and which is so constructed as to prevent the entrance of air to the condenser and therethrough to the heating system, and which, at the same time, permits the escape of exhaust steam from the exhaust pipe in case there should be a greater volume of exhaust steam discharged into the exhaust pipe than can be promptly consumed by the condenser and heating system.

My invention also contemplates the use of a governing device in connection with the engine which is so constructed as to vary the time of closing of the exhaust valves and to thereby adjust the engine to different back pressures, whereby the clearance spaces of the cylinder may be filled with the exhaust steam at a constant temperature and pressure, notwithstanding the variations of the back pressure.

In the practical adaptation of my invention to a combined heating and power apparatus, special fittings are provided, as will hereinafter more fully appear, to enable the system to successfully operate under the high vacuum to which it is adapted. An exhausting apparatus is connected with the heating devices of the system so as to exhaust the air from said heating devices in first starting the heating system and maintaining such difference of pressure between the feed and return sides of the system as to insure the proper flow of the steam into and through the heating devices. Such exhausting apparatus is placed under the governing influence of the feed and return sides of the heating system and operates to maintain a constant difference of pressures between the said feed and return sides of the system, regardless of the absolute pressures maintained therein.

Figure 2:
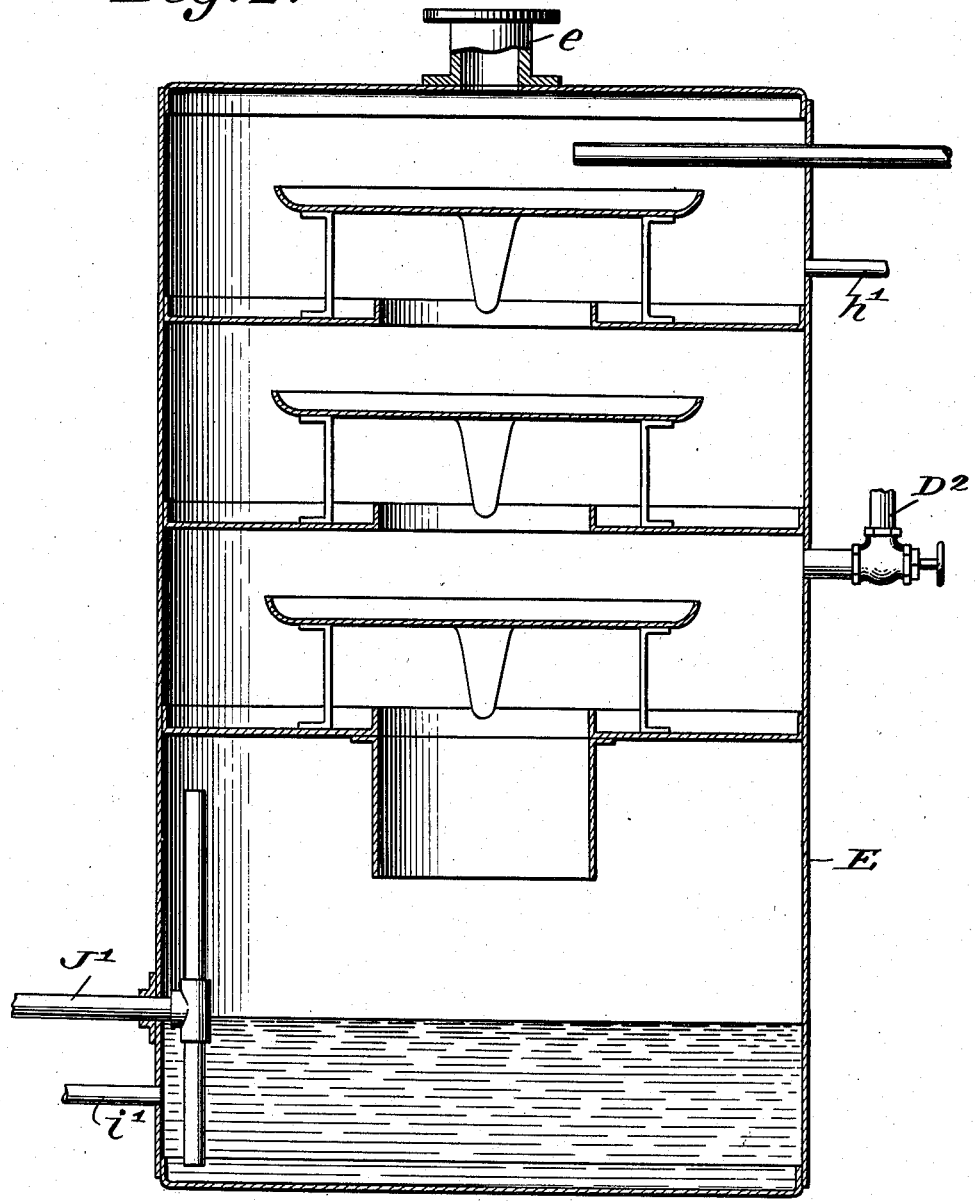
Figure 3:
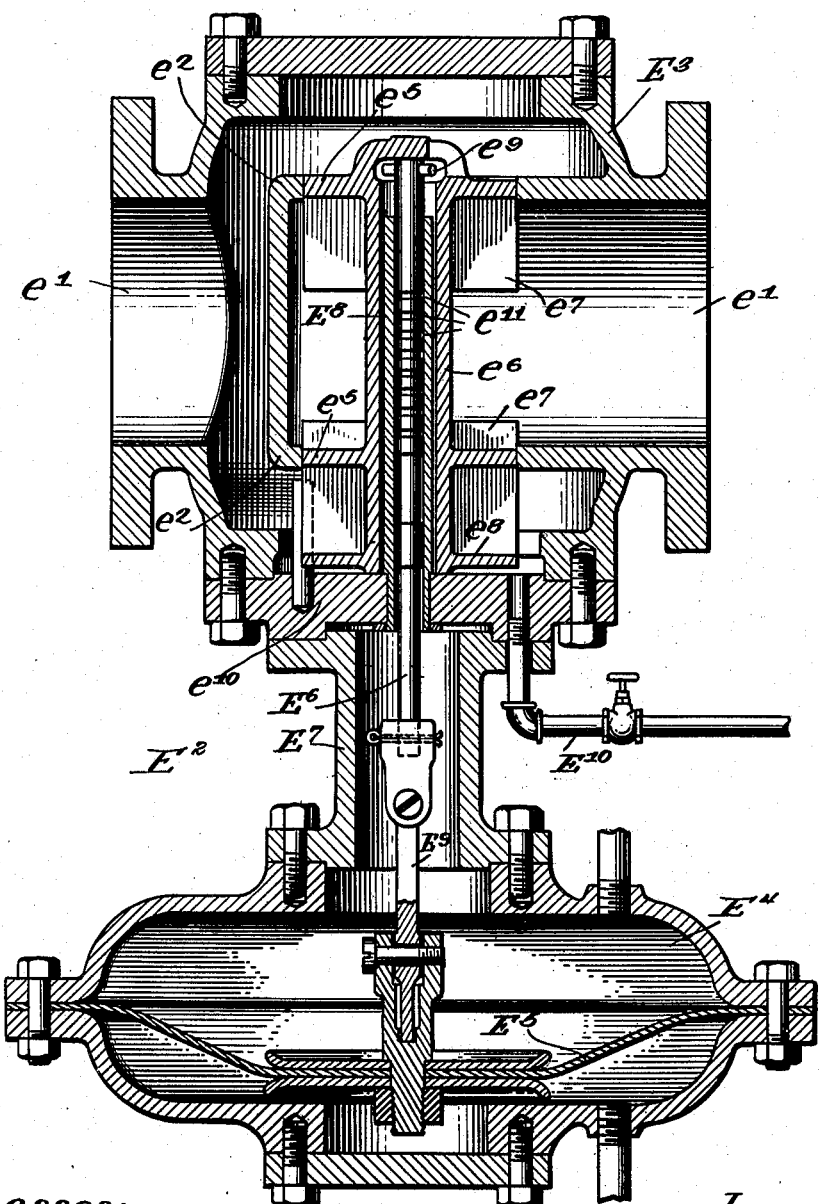
Figure 13:
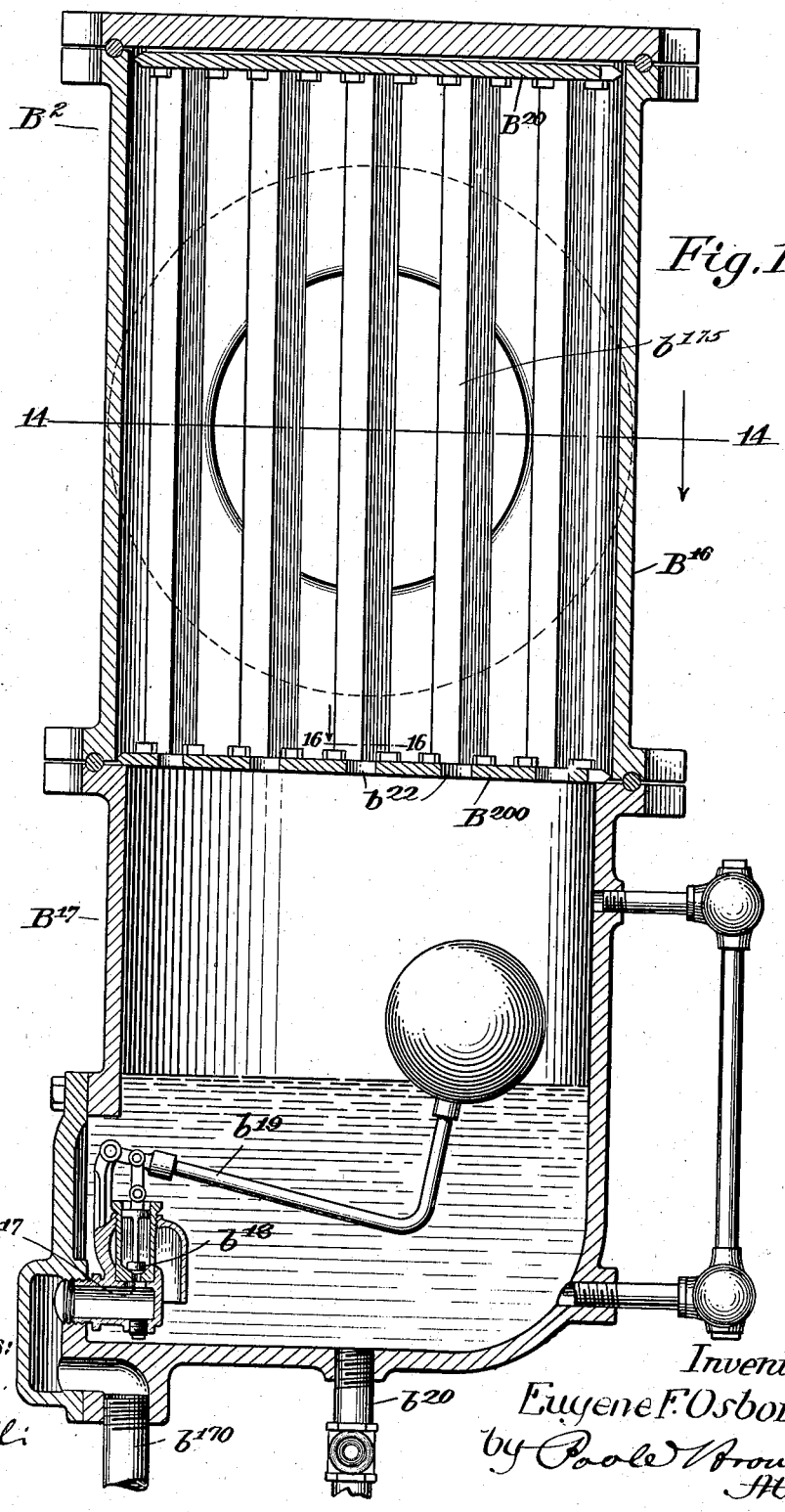

In the drawings:—Figure 1 is a diagrammatic view of a combined steam power and heating system made in accordance with my invention. Fig. 1$^a$ is a sectional elevation of a governing valve for controlling the engine of the exhaust pump. Fig. 1$^b$ is a sectional elevation of a governing device for controlling the engine of the pump of the circulating system through which the condensing water is circulated to cool the same. Fig. 1$^c$ is a sectional view of the three-way valve $c^{19}$ hereinafter-referred to. Fig. 2 is a vertical section of a condenser forming part of said system. Fig. 3 is a vertical section of a valve for regulating the supply of the condensing agent to the condenser. Fig. 4 is a vertical section of an air check valve for preventing the admission of atmospheric air to the heating system. Fig. 5 is a detail section taken on line 5—5 of Fig. 4. Fig. 6 is a horizontal section taken on line 6—6 of Fig. 4. Figs. 7, 8 and 9 are details illustrating devices for adjusting the angle of the weighted lever of said air check valve. Fig. 10 is a partial side elevation of a Corliss engine, showing applied thereto a pressure governor for regulating the closing of the exhaust valves of the engine. Fig. 11 is a vertical section of the governor. Fig. 12 is a detail section taken on line 12—12 of Fig. 10. Fig. 13 is a vertical section of an improved form of grease catcher and dehydrator interposed between the engine and condenser. Fig. 14 is a cross-section taken on line 14—14 of Fig. 13. Fig. 15 is a fragmentary, perspective view, showing the form of the intercepting or baffle bars and the manner of securing the same in place. Fig. 16 is a detail section, taken on line 16—16 of Fig. 13. Fig. 17 is a fragmentary section of a radiator showing the associated feed and return fitting, and a valve through which air is admitted to the radiator and withdrawn therefrom. Fig. 18 is a cross-section, taken on line 18—18 of Fig. 17. Fig. 19 is a sectional view of a seal fitting located in the main steam distributing pipe through which steam is directed from the steam main to the heating devices and the water of condensation is directed from the heating devices back to the steam main. Fig. 20 is a longitudinal axial section of an air valve shown in the upper radiator in Fig. 1. Fig. 21 illustrates a radiator located at or below the level of the water collecting tank of the system, and the feed and return fittings therefor. Fig. 22 illustrates the application to a radiator of an approved form of thermostatic regulating valve. Fig. 23 is a vertical section of a steam check valve associated therewith. Fig. 24 is a vertical section of the thermostat proper. Fig. 25 is a detail illustrating the valve of said thermostat. Fig. 26 is a top plan view, partially broken away, of a shifting valve associated with the apparatus shown in Fig. 22. Fig. 27 is a vertical section thereof, taken on line 27—27 of Fig. 26.

First referring to Fig. 1, which illustrates diagrammatically a combined steam power and heating plant made in accordance with my invention,—A designates a boiler in which steam for power and heating purposes is generated, B an engine which receives steam from said boiler and in which a portion of the steam is converted into power, and C C$^1$ C$^2$ designate the heating devices or radiators of a steam heating system in which is utilized a portion of the heat of the exhaust steam from the engine to heat the space surrounded by said devices. The exhaust steam is conveyed to said heating devices through horizontal and vertical distributing pipes D D$^1$, respectively, the latter being connected with the heating devices by branch pipes $c$. Interposed between said heating devices and the engine is a condenser E which may be made of any suitable type and is herein illustrated as a water surface condenser provided with the usual horizontal pans and in its lower part with a water chamber (Fig. 2). The exhaust pipe B$^1$ of said engine enters the condenser through a neck $e$ in the top wall thereof. The horizontal distributing pipe D is connected with said condenser through the medium of a pipe D$^2$ which enters the condenser near the longitudinal center thereof. The supply steam pipe $a$ which conveys steam to the engine is shown as provided with a dehydrator A$^1$ and the water collected in said dehydrator is carried by a pipe $a^1$ back to the boiler A. The exhaust pipe B$^1$ is provided between the condenser and engine with a grease extractor and dehydrator B², shown in detail in Figs. 13 to 16 inclusive, and hereinafter described, and it discharges its contents through a pipe $b^{170}$ into a catch basin or tank B¹⁵ beneath the same. Said exhaust steam pipe is also provided with an air check valve, indicated as a whole by the reference letter F. An approved form of air check valve is illustrated in detail in Figs. 4 to 9 inclusive, and will be hereinafter described.

Water or other condensing agent is delivered to the condenser E through a pipe E¹ leading from any suitable source supplying the condensing agent, and said pipe is provided with an automatic regulating valve or throttle, designated as a whole by E², and shown in detail in Fig. 3. Said regulating valve or throttle is, in this instance, controlled by the condition of pressure in the feed side of the heating system in such manner that the steam not required for heating purposes is condensed and the parts coöperate with appliances which act to maintain a predetermined pressure in the heating system, so long as there is sufficient exhaust steam for heating purposes. That is to say, the exhaust steam which is delivered into the condenser E is utilized in the heating system to the extent which it is required in order to heat the same, and such exhaust steam as is not required in the heating system is condensed in the condenser in the usual manner, and the automatic regulating or throttle valve E² is so operated as to deliver the condensing agent to the condenser in such quantities that the steam not required for the steam heating system will be condensed. When there is not sufficient exhaust steam to supply the heating apparatus live steam is admitted to the pipe D through a live steam pipe $a^2$ provided with a pressure regulating valve A³ which is constructed and operates in the general manner of the valve shown in my U. S. Letters Patent, No. 791,811, granted June 6th, 1905.

The branch pipes $c$ delivering steam to the radiators lead from special seal fittings G located in the riser D¹, and illustrated in detail in Fig. 19. The branch feed pipes $c$ enter feed and return fittings C³ at one side of the radiator, the side of the radiator remote from the riser as herein shown. Said fittings C³ are each provided at its top with screw-threaded opening which receives the pipe $c$ and is provided at its lower end with a screw-threaded opening which receives the water of condensation pipe C⁴ through which the water of condensation is carried away from the heating devices. The lower end of each water of condensation pipes C⁴ discharge, as herein shown, into the next lower seal fitting G. Each feed and return fitting is provided with an interior branch $c^2$ to which is connected a pipe $c^3$ (Fig. 17) which extends through the base of the radiator and delivers steam to the side thereof remote from said fitting.

C⁵ C⁶ designate air pipes through which air is discharged or withdrawn from the heating devices or radiators, and said air pipes are connected at their lower ends with a return pipe C⁷ which is connected at its other end with a central exhausting apparatus. As herein shown, the pipe C⁷ constitutes also the water of condensation return pipe and is connected with the pipe D¹ through the medium of a trap C⁸ of any preferred type. The air and water pipes may, optionally, be separate.

The central exhausting and water return apparatus consists of a pump H into the induction side of which enters the pipe C⁷, and the eduction side of said pump is connected through a pipe $h$ with a closed water tank H¹, which latter tank is connected by a pipe $h^1$ with the condenser E, whereby the water of condensation is carried to the condenser for the purpose of producing whatever condensing effect it may possess. The water tank H¹ is provided with a blow pipe $h^{10}$ through which air mixed with the return water may be discharged from the system. The live steam pipe $h^2$, which delivers steam to the engine H², which operates the water pump H, is provided with a pressure controlled valve H³ (Figs. 1 and 1ᵃ) of any common or preferred type of that class wherein the movable part or closure $h^{50}$ is connected with and operated by a diaphragm $h^{51}$ which is subject, on its opposite sides to differential pressures. One side of the diaphragm is subjected to the feed pressure and the other to the return pressure of the heating system through the pipes $h^3$ $h^4$, respectively, the former being connected with the steam pipe D² and the latter with the return pipe C⁷. Said valve H³ embraces a vertically swinging lever $h^5$ having a shifting weight $h^{52}$ and the lever is loosely connected between its ends to a rod or stem $h^{53}$ that connects the closure with said diaphragm and the weight acts with the lower pressure on the diaphragm. The weight $h^{52}$ effects and maintains, through its regulative effect on the steam delivered to the engine H², a constant difference in pressure between the feed and return sides of the system.

Water is drawn from the lower end of the condenser by a feed pump I to supply the boiler A. The engine of said feed water pump I is supplied with steam through the medium of a steam pipe $i$ leading from the live steam pipe $a$. Preferably and as herein shown, the condensing water delivered through the pipe E¹ to the condenser for the purpose of condensing the steam therein is taken from a closed circuit which is supplied from the lower end of the condenser tank, whereby the condensing water is used over and over again, and in which closed circuit the water is suitably cooled between the time it is withdrawn from the condenser and the time it is again discharged thereinto. Such circuit embraces the following parts:

J designates a hot water pump the engine of which receives steam through the steam pipe $j$ connected with the steam pipe $a^2$. The induction side of said pump is connected through the medium of a pipe $J^1$ with the lower end of the condenser tank E, and included in said pipe $J^1$ is a governor $J^2$ of any suitable type which controls the supply of steam to the engine which operates the pump in a manner to maintain in the condenser tank a body of water to a given or determined level. The governor $J^2$ is of the float type, it consisting of a casing $J^{50}$ into which the pipe $J^1$ discharges and is provided with an eduction pipe $J^{51}$ through which the water is discharged therefrom to the pump J. A float $J^{52}$ carries a valve $J^{53}$ operating in a suitable valve chamber $J^{54}$ and controls the passage of steam through the pipe $j$ the parts of which communicate with said valve chamber in the manner shown in Fig. 1$^b$. The receiving end of the pipe $J^1$ within the condenser tank is branched upwardly and downwardly so as to maintain a body of water in the tank at a level of the pipe $J^1$, the upper branch of said pipe $J^1$ serving as an air release pipe to prevent siphoning of the water from the condenser through the lower branch. The feed water pipe $i^1$ leading from said condenser communicates with the latter below the determined water level in said condenser tank.

The circuit through which the water employed for condensing purposes is forced by the hot water pump J consists of a vertical pipe $J^3$, a horizontal pipe $J^4$ and a second vertical pipe $J^5$, the terminal end of which latter pipe discharges into a collecting tank $J^6$ from which water is drawn by the pipe $E^1$ which delivers the condensing water to the condenser. The water withdrawn from the condenser E is at the same temperature as the steam in the condenser and this heat may be utilized for any useful purposes while passing through said closed circuit. For instance, it may be utilized in a heating device $J^7$ in said circuit, shown in Fig. 1, for the purpose of heating an apartment or the like. An air release chamber $J^{10}$ is included in said closed circuit through which air is discharged from the water with which it may be mixed or entrained in said circuit. If there be no useful purpose for which to employ the heat of the water, the water drawn from the condenser may be cooled in any other suitable manner before it is again delivered to the pipe $E^1$ and therethrough discharged into the condenser. When a closed circuit is employed, as herein shown, the collecting tank $J^6$ is desirably connected with the low pressure or return side of the heating system, as by means of a valved pipe $j^3$, thereby reducing the power necessary to operate the hot water pump J to force the water through the circuit.

The pressure in the catch basin $B^{15}$ is decreased by connecting said basin with the return side of the system, as by means of the valved pipe $B^{120}$ connected with the return pipe $C^7$. The accumulated gases and water may be forced from said basin at a time when the pipe $B^{120}$ is closed through the valved discharge pipe $B^{121}$ thereof by steam pressure introduced thereinto through a valved steam pipe $B^{122}$ connected with the live steam pipe $i$ before mentioned. Under usual working conditions, the valved discharge pipe $B^{121}$ is closed.

The construction of the pressure controlled throttle valve $E^2$ which regulates the supply of the condensing liquid to the condenser, and the manner of operating said valve, will now be explained, reference being had to Figs. 1 and 3. Said valve comprises a casing $E^3$ provided on its opposite sides with branches $e^1$ $e^1$ with which are connected the parts or sections of the water pipe $E^1$. The inlet passage is continued inwardly to form inside the casing a closed box like structure the upper and lower walls $e^2$ $e^2$ of which are provided with alined ports through which the water passes from the inlet to the outlet side of the valve. Said ports are closed by upper and lower, upwardly opening, valve closures consisting of plates $e^5$ $e^5$ which fit closely in said ports and are rigidly connected by a sleeve $e^6$. Said sleeve is provided with integral radial guide wings $e^7$ which engage the margins of said ports when the valves are raised from their seats to constitute guides for said closures. Below the lowermost closure $e^5$ is a horizontal balance disk $e^8$ connected therewith by the sleeve $e^6$ and the lower guide wings $e^7$, said disk $e^8$ acting to equalize the kinetic force of the fluid passing through the valve and to prevent the same from overbalancing the valve in a manner tending to hold the valve open. $E^4$ designates a diaphragm chamber located beneath the valve chamber, and $E^5$ the diaphragm within said chamber. Connected centrally with said diaphragm, preferably by a loosely connected link $E^9$, is an endwise reciprocating valve stem $E^6$ which extends upwardly through a neck $E^7$ connecting the diaphragm chamber and the valve casing, and said stem is connected by means of a cross-pin $e^9$ with the upper end of the sleeve $e^6$ connecting the valve closures, whereby motion is communicated from the stem to said closures. The diaphragm is acted upon at its upper and lower sides by opposing fluid columns, the fluid of the upper column filling the upper part of the chamber and the neck $E^7$, and the fluid of the lower column filling the lower part of the chamber. The said valve stem $E^6$ extends upwardly through a packing sleeve $E^8$ which is attached rigidly to and extends upwardly from the lower wall $e^{10}$ of the valve casing, and through the sleeve connecting the upper and lower parts of the valve. Said stem $E^6$ fits closely within the packing sleeve $E^8$ and is provided with a number of exterior annular grooves $e^{11}$ which are filled by fluid from the upper column, the whole constituting a water packing which prevents the escape of water to the valve chamber. The location of the packing for the stem within the valve sleeve $E^8$ enables the valve, as a whole, to be materially shortened. The valve chamber is provided with a drain pipe $E^{10}$ to drain off any water collecting therein. The liquid columns acting oppositely against the diaphragm and controlling the movable parts of the valve $E^2$ are supplied from liquid contained in two tanks or receptacles $E^{11}$ $E^{12}$, the tank $E^{11}$ communicating with the upper part of the diaphragm chamber through a pipe $e^{12}$ and the tank $E^{12}$ communicating with the lower part of the diaphragm chamber through a similar pipe $e^{13}$. The tank $E^{11}$ is open to the atmosphere while the tank $E^{12}$ is subject to the pressure in the feed side of the system; it being herein shown as connected with the horizontal distributing pipe D through the medium of the pipe $E^{13}$, which communicates with said tank $E^{12}$ above the liquid level therein.

As before stated, the closure of the automatic valve $E^2$ opens upwardly and closes downwardly. As will be observed by an inspection of Fig. 1, the weight of the liquid column in the tank $E^{11}$ is exerted on the top of the diaphragm in a manner to close the valve while the liquid column in the tank $E^{12}$ and its connecting pipe $e^{13}$ is exerted on the bottom of said diaphragm in a manner to open the valve. The degree of vacuum to be maintained in the feed side of the heating system is dependent, therefore, upon and regulated by, the relative differences in pressures on the opposite sides of the diaphragm $E^5$. When operating the system under a vacuum, as it is herein designed to operate, the level in the liquid tank $E^{11}$ is lower than that in the tank $E^{12}$, whereby the effect of the opposing liquid columns is to hold the valve open and permit the condensing fluid to pass freely into the condenser when the system is first started in operation. If a vacuum, of say 20 feet of water, is to be maintained in the feed side of the heating system, the difference between the levels of the liquid in two tanks will be in the neighborhood of 10 feet. When steam is first admitted to the condenser and feed side of the system, after the air has been exhausted from the system by the exhausting device preparatory to starting the system in operation, the free flow of the condensing liquid to the condenser first operates to condense the greater portion of the steam, so that in a short time a vacuum will be established in the feed side of the system which will continue until the predetermined vacuum is reached. Upon establishing the predetermined vacuum in the feed side of the heating system, such vacuum will be exerted, through the pipe $E^{13}$, upon the liquid column in the tank $E^{12}$ and its pipe $e^{13}$ to neutralize the force of such liquid column to open the valve, whereupon the pressure of the column in the tank $E^{11}$ will act on the upper side of the diaphragm to close the valve and thereby reduce or cut off the supply of the condensing agent to the condenser. The effect of reducing the supply of condensing agent to the condenser is to reduce the volume of steam condensed therein, whereby the steam required for heating purposes is diverted to the heating system. If there be but only sufficient exhaust steam produced to supply the heating system at the predetermined vacuum, such vacuum when established in the feed side of the system will effect the complete closing of the valve $E^2$ and arrest further condensation until, by reason of a decreased consumption of the steam in the system, or an increased supply of the exhaust steam to the condenser, it is required that a portion of the steam be again condensed. Upon the happening of either of the events mentioned, the decrease of the vacuum in the feed side of the heating system diminishes the lifting effect of such vacuum on the column in the tank $E^{12}$ and its connecting pipe, wherefore the superior weight of such column acts to open the valve $E^2$ and permit the discharge of more or less of the condensing fluid into the condenser, as conditions may require and effect the condensation of the steam not required for heating purposes.

In order to operate the system herein shown under the most economical conditions, the steam should be used in the heating system at as great a vacuum as is practical while employing the exhaust device shown for maintaining a proper circulation of steam through the system, thereby maintaining a low back pressure in the engine. Such low back pressure is maintained when the system is in full operation either by the use of all the exhaust steam in the heating system, or the use of a part of the steam therein and the condensation in the condenser E of the remainder of the steam, or by the condensation of all the steam in the condenser when the heating system is out of service. The tank $E^{11}$, in which a variable column is maintained to effect the establishment of varying vacuums in the feed side of the system, is supplied with liquid through a pipe $e^{16}$ which is connected with a liquid supply pipe $e^{17}$. Said pipe $e^{17}$ is also connected with a pipe $e^{18}$ through which liquid is supplied to the collecting tank $J^6$ of the condensing fluid circuit, whereby such condensing fluid may be replenished as necessary. A three-way valve $e^{19}$ is located at the intersection of the pipes $e^{16}$ $e^{17}$ $e^{18}$, Figs. 1 and 1$^c$, whereby the fluid delivered to the pipe $e^{17}$ may be directed either into the tank $E^{11}$ or tank $J^6$, or the fluid from the tank $E^{11}$ may be discharged directly through the pipes $e^{16}$ and $e^{18}$ to the tank $J^6$. A valved pipe $e^{30}$ connects the pipes $e^{12}$ and $e^{13}$ and the valve of the connecting pipe is normally closed. By opening the valve of said connecting pipe and properly adjusting the valve $e^{19}$, water may be drawn from the tank $E^{12}$ through the pipe $e^{13}$, said connecting pipe, the pipe $e^{12}$, the pipe $e^{16}$ and the pipe $e^{18}$ into the tank $J^6$. The three-way valve $e^{19}$ is of ordinary construction, as shown in Fig. 1$^c$. It consists of a casing having ports $e^{190}$ $e^{191}$ and $e^{192}$ with which the pipes $e^{17}$ $e^{16}$ and $e^{18}$, respectively, communicate, and a hollow rotative plug $e^{193}$ in open communication with the pipe $e^{17}$ and provided with a radial port $e^{194}$ adapted, by rotation of the plug, to be brought into register with either of the ports $e^{191}$ or $e^{192}$, or to be brought opposite to an imperforate part of the casing wall to close the valve. By raising or lowering the liquid level in the tank $E^{11}$ and thereby varying the relative levels in the tanks $E^{11}$ and $E^{12}$, the working vacuum in the feed side of the heating system may be varied.

The pressure controlled valve $A^2$ through which live steam is admitted to the heating system when required is controlled through the medium of the liquid columns in the liquid tanks $E^{11}$ $E^{12}$, as herein shown, such tanks being connected with the diaphragm chamber of the valve by means of pipes $e^{14}$ $e^{15}$. In a system of this character, the back pressure on the engine is variable within comparatively wide limits owing to the fact that the load on the engine is subject to variations and also that the load on the heating system is constantly changing and may be suddenly changed through wide limits. It is desirable in order to establish and maintain the most economical efficiency of the apparatus as a whole that the closing of the exhaust valves of the engine should be timed to accord with the variations of back pressure in the engine and thereby insure a substantially constant pressure and correlative temperature of the exhaust steam in the clearance spaces of the engine cylinder. That is to say, when the back pressure in the engine is low there should be retained sufficient exhaust steam in the cylinder to fill the clearance spaces thereof at a given pressure and temperature and, for this reason, the exhaust valves should be closed early in the travel of the piston. When, on the other hand, the back pressure is increased the exhaust valves should be closed later in the travel of the piston and thereby prevent too high a pressure of the steam in the clearance spaces. The means herein shown for effecting this result is illustrated more clearly in Figs. 1, 10, 11, and 12 and are made as follows: The engine herein shown is a Corliss engine and embraces the usual inlet valves at the top of the cylinder to the stems $b$ of which (Fig. 10) are connected the usual cams $b^1$ and cam arms $b^2$ which operate, in connection with any familiar form of governor, and with crab claws, latch blocks (not shown) and dash pots for variably cutting off the admission of live steam to the cylinder. $b^3$ designates the usual wrist plate and $b^4$ links connected at their inner ends to the wrist plate and which are adapted to be connected at their outer ends with the usual bell-cranks and latch blocks which, in connection with the cams $b^1$, act to control the closing movements of the valves. In order to control the closing movements of the exhaust valves, I propose to apply to the exhaust valves a governing gear similar to that applied to the steam inlet valves of the usual Corliss engine. To this end the stems $b^5$ of the exhaust valve are provided with cams and cam arms $b^6$ $b^7$, respectively, which arms are connected by means of links or rods $B^4$ $B^4$ with the ends of a rocker $B^5$ which is pivoted by a bolt or pin $b^{160}$ to the engine frame. Said rods or links $B^4$ carry at their ends bolts $b^{170}$ which extend through slots in said rocker, as more clearly shown in Fig. 12, whereby the links have adjustable slotted connection with the rocker. Said bolts are clamped to said rocker by nuts $b^{171}$. The rocker $B^5$ is provided with a rigid arm $B^6$ which is connected with a suitable pressure governor which is controlled by the back pressure of the engine in such manner that as the back pressure is increased the exhaust valves will be closed later in the travel of the piston and, conversely, as the back pressure is decreased the exhaust valves will be closed earlier in the stroke of the piston.

I have shown in detail in Figs. 10 and 11 one convenient form of pressure governor which is adapted to the purposes above specified, said governor being made as follows: $B^7$ designates a hollow casing which is open at its lower end and closed at its upper end by an end wall $b^{200}$. $B^8$ designates a reciprocating piston which fits tightly in the lower end of the casing and the stem $B^9$ of said piston is loosely connected or hinged at its lower end to the arm $B^6$ of the rocker $B^5$. The casing is provided at its lower end with a removable plate which has an annular flange $b^9$. Between said flange $b^9$ and the wall of the casing $B^7$ is formed an upwardly opening oil chamber adapted to receive the annular flange $b^{210}$ of the piston when in the lower part of its movement, whereby the piston is lubricated. The oil chamber is provided with a charging passage $b^{220}$ at its side. Said casing is divided into a lower piston chamber and an upper filling chamber by means of a horizontal diaphragm $b^{10}$, and said diaphragm is provided with a port or opening which is closed by a valve $b^{11}$ affixed to the lower end of a valve stem $b^{12}$ which has screw-threaded engagement with the top wall $b^{200}$. The top wall $b^{200}$ is provided with an opening through which a liquid is introduced into the upper or filling chamber and said liquid is admitted to the piston chamber above the piston by opening the valve $b^{11}$. Said stem $b^{12}$ is extended below said valve to form a stop $b^{13}$ to limit the upward movement of the piston $B^8$. $B^{10}$ designates a small valved pipe which enters the piston chamber at one side thereof and is connected at its other end with the distributing pipe D of the heating system (Fig. 1), whereby said piston chamber is in open communication with the steam space of the feed side of the system. The weight of the column of liquid supported by the piston $B^8$ acts to normally hold the piston depressed and the vacuum in the pipe D acts, through the pipe $B^{10}$, to lift said column of liquid so that the piston $B^8$ may be raised by the superior atmospheric pressure beneath the same, the liquid being transferred to the pipe $B^{10}$. Said pipe is made much smaller than the piston chamber, whereby the action of the vacuum on the parts is closely graduated. The vertical movements of the piston act, through the rocker $B^5$ and links $B^4$, to shift the cams $b^6$ and thereby change the time of the exhaust cut off. If, for instance, the full weight of the column of liquid acts to depress the piston $B^8$ it may be assumed (under the present conditions) that the back pressure is substantially atmospheric pressure, and at this time the exhaust is cut off at times in the travel of the piston suitable to atmospheric back pressure. Upon the decrease of the back pressure, however, the weight of the column of liquid above the piston $B^8$ will be partially lifted thereby allowing the piston to rise by reason of the atmospheric pressure beneath the same, and through the connections described, the time of exhaust cut-off is varied.

Any suitable form of air check valve may be used at the end of the exhaust pipe $B^1$ beyond the connection thereof with the condenser, such as will prevent the entrance of air into the exhaust pipe upon the reduction of the pressure therein at or below the atmosphere.

I have shown in Figs. 4 to 9, inclusive, an approved form of air check valve which is made as follows: Said valve, which is designated as a whole by the letter F, comprises a vertical annular casing $F^1$ which is reduced at its ends and provided with upper and lower flanges for attachment to the sections of the exhaust pipe $B^1$. The casing is provided interiorly thereof near its lower end with a reduced annular flange $F^2$, the upper face of which constitutes a seat against which fits a vertically movable valve closure $F^3$. Said closure is provided on its under face with a yielding ring $f^2$ which engages the valve seat formed on the flange $F^2$ and with a disk $F^4$ which fits closely inside the upper end of said flange. $F^5$ designates a valve stem which extends centrally through the valve closure and has screw-threaded engagement with the disk $F^4$. Said stem is connected by means of links $f^4$ $f^4$ with an oscillatory vertically swinging lever $F^{15}$ above the valve which is pivoted at one end to a pivot pin $f^5$ fixed to one side wall of the casing $F^1$, and is provided at its other end, laterally beyond the stem $F^5$, with a gear segment $F^6$ which meshes with a similar gear segment $F^7$ which is non-rotatively affixed to a rock shaft $F^8$ rotatively mounted in a sleeve in a removable part $f^8$ of the valve casing. Attached to the rock-shaft is a weighted lever $F^9$. The end of the sleeve through which the rock-shaft $F^8$ extends is provided with a stuffing box which surrounds the shaft to prevent the leakage of steam or air therethrough. The lever carries at its outer end a sliding adjustable weight $F^{10}$ and also a flat retarding plate $F^{11}$ which is herein shown as attached to or formed integral with the weight $F^{10}$. When the valve is closed, as shown in Fig. 4, the weighted lever $F^8$ assumes an angle to the horizontal, as shown in Fig. 4, in the neighborhood of 60° and the said weight and the movable parts of the valve are so proportioned that when the lever is at this angle, the valve and associated parts overbalance the weight and lever so that a pressure in the exhaust pipe in excess of atmospheric pressure is required to initially lift the valve to open the same. When, however, the valve is opened by the superior pressure of the steam in the exhaust pipe, the rising of said valve acts through the gears on the levers $F^{15}$ and $F^9$ to throw the outer end of the lever $F^9$ downwardly and when said lever begins to move downwardly its force to lift the valve is gradually increased until it approaches a horizontal position. The retarding plate $F^{11}$ prevents the weight from throwing the lever abruptly downwardly and bringing objectionable jars and shocks on the movable parts of the valve. When the weighted lever occupies its lower position and when, therefore, the valve closure is raised off its seat, said lever and weight balances the closure so that no pressure other than that exerted by the kinetic energy of the steam escaping past the same is required beneath the closure to hold the same off its seat. When the pressure in the exhaust pipe is below atmospheric pressure, such atmospheric pressure acts on the upper face of the closure to close the valve and hold it closed and when said pressure in the exhaust pipe exceeds atmospheric pressure, the valve is opened by the superior pressure beneath the same.

Means are provided for varying the angle of the lever $F^9$ relatively to the rock-shaft $F^8$, whereby may be accurately attained the angle required to properly balance the movable parts of the valve in the manner before described. Said means, as herein shown, consist of a sleeve $f^7$ which is rigidly affixed to the rock-shaft and provided with an annular flange $f^8$, and a disk $f^9$ which is free to rotate on said rock-shaft and is interlocked with the lever $F^9$ to rotate on its axis as said lever is swung on its axis of oscillation. As herein shown, the disk is provided on its outer face with a notch $f^{10}$ which receives said lever, and the lever and disk are affixed to the shaft with the faces of the flange $f^8$ and disk $f^9$ engaging each other, by means of a screw-bolt $f^{11}$ extending through said lever and into the end of the rock-shaft. The adjacent or contacting faces of the disk and flange are provided with teeth $f^{12}$ (Figs. 7 and 8) whereby, when said parts are locked together by the bolt $f^{11}$, the disk $f^9$ and interlocked lever are held immovably at the angle desired relatively to the horizontal plane of the axis of the shaft $F^8$. It is desirable in a valve of this character that it should be either completely closed or completely open, and that while open it should not require pressure from the steam beneath to hold it open. It is also desirable that the valve closure should be so proportioned and weighted that it will not be opened by slight variations of back pressure in the exhaust pipe due to the distinct pulsations occurring in the separate strokes of the piston, but it is advisable that such closure should not be opened until a substantial back pressure has accumulated in the exhaust pipe; and when such condition of back pressure occurs it is desirable that the valve be opened promptly to reduce the back pressure. In other words, it is undesirable that the air check-valve shall be opened and closed during each distinct pulsation of the engine when the back pressure is hovering around atmospheric pressure.

It is a preferred construction, which will now be described, that the valve shall be opened only by a back pressure somewhat in excess of atmospheric pressure, regardless of the pulsations of the engine and shall remain open until the back pressure is reduced to or slightly below atmospheric pressure. The construction by which this result is accomplished is made as follows: The closure $F^3$ is extended radially beyond the packing ring $f^2$ thereof, as clearly shown in Fig. 4, and is turned downwardly to form an annular rim $F^{12}$ which fits closely within an annular, inwardly facing seat formed by the inner face of a vertical annular flange $F^{13}$ in the casing. The valve is not fully opened, therefore, until the rim $F^{12}$ is raised above the upper margin of the flange $F^{13}$. The extension of said valve closure plate $F^3$ in the manner described provides outside of the circumferential area of the valve seat an added surface which is not subject to steam pressure when the valve is closed, but against which the steam acts when the valve is raised sufficiently to lift the disk $F^4$ of said closure above the level of the seat. The area against which the steam acts when the valve is fully seated is represented by the area of the disk $F^4$ of the closure, which is less than the area acted upon by the atmosphere, but when said disk is raised above the level of the valve seat, the area is increased by adding thereto the annular surface $f^{120}$ of the plate $F^3$ of the closure and that part of the yielding ring $f^2$ in line with the flange $F^2$, so that the additional upward force exerted by the steam on the added surface of the valve acts to quickly open the valve. It will be understood, however, that the movements of the valve both to open and close the same are not abrupt but are gradual by reason of the provision of the retarding plate $F^{11}$, hereinabove referred to. When the valve is being seated, its closing movement is further retarded by reason of the entrance of the rim $F^{12}$ within the flange $F^{13}$, the flange constituting a pocket which contains a body of cushioning fluid which retards the seating movement of the valve.

The grease catcher and dehydrator $B^2$ located in the exhaust pipe, as shown in detail in Figs. 13 to 16, inclusive, is made as follows: Said device consists of a grease and water separating chamber $B^{10}$ provided at its opposite sides with steam inlet and exit passages $b^{15}$ $b^{16}$, respectively, (Fig. 14) and provided inside said chamber between said passages with a plurality of vertical intercepting or baffle-bars $b^{175}$, made of a non-corrodible metal, as copper, upon which is deposited out of the steam the grease and water. Beneath said separating chamber and in open communication therewith is a water collecting chamber $B^{17}$ provided with a discharge passage $b^{17}$ which is closed by a valve $b^{18}$ operated by a float mechanism indicated as a whole by $b^{19}$, and constructed to open the valve upon the rise of the water in said chamber to a certain height and to close said valve when the water level recedes below said height. Liquid is thus automatically and intermittently discharged through the valved passage $b^{17}$ and the pipe $B^{170}$, before referred to, into the catch basin $B^{15}$ below. Said chamber is provided with a valved drain pipe $b^{20}$ located below the level of the float controlled valved outlet $b^{17}$ by which the liquid contents may be drained from the chamber $B^{17}$ when desired.

The intercepting bars or baffle plates $b^{175}$ are of special construction and are illustrated more clearly in Figs. 14 to 16, inclusive. They consist of a plurality of pairs of angle or trough-like bars $B^{18}$ $B^{19}$ which are attached at their upper and lower ends to plates $B^{20}$ $B^{200}$ extending across and loosely secured in the upper and lower ends of the separating chamber. The plate $B^{200}$ is perforated to permit water and grease to pass from the separating chamber into the collecting chamber $B^{17}$. The open sides of the trough-like or angle bars $B^{18}$ are directed towards the steam inlet side of the chamber while the trough-like or angle members $B^{19}$ are located within the side parts of the members $B^{18}$ and with their closed sides directed toward the steam inlet passage of the separating chamber. The margins of said parts $B^{19}$ are provided with notches $b^{21}$ to permit the water and grease to pass to the inner faces of the parts $B^{19}$ and thereby prevent the steam pressure from impeding the downward flow of the water and grease which collects on said bars. Each of said pairs of bars are fitted over one of the openings $b^{22}$ of the plate $B^{200}$ so as to direct the grease and water therethrough to the water collecting chamber, and said bars are held in place on the upper and lower plates by blocks $b^{23}$ $b^{24}$ in the manner shown in Figs. 14, 15 and 16.

Referring next to the construction of the air valve $C^{11}$ shown in Figs. 17 and 18, which is applied to the fitting of the radiator $C^1$, it consists of a casing $C^{12}$ having a tapered interior opening in which is contained a tapered valve plug $C^{13}$ which is pressed against its annular, tapered seat by means of a spring $c^4$ interposed between the lower end of the plug and the bottom, removable wall of the casing. Said casing is provided with a branch $C^{14}$ which is exteriorly screw-threaded to fit within an interiorly screw-threaded opening of the fitting $C^3$, said tubular branch extending a distance into said fitting. The plug is provided on one side with an exterior longitudinal groove $c^5$ constituting a passage which is adapted to be brought into register with the bore of the branch $C^{14}$ to permit air to pass from the radiator to the valve casing and vice versa and said passage $c^5$ is normally in communication with a passage $c^6$ leading through the lower wall of the casing and communicating with the exhaust pipe $C^6$. The upper end of the passage $c^6$ is formed in a boss $c^7$ rising from the lower wall of the casing. When the passage $c^5$ is in register with the bore of the branch $C^{14}$, and the valve plugs $C^{13}$ is held against the seat, free communication is established between the exhaust steam pipe $C^6$ and the interior of the radiator to withdraw the air and steam therefrom. The lower end of the tapered valve plug $C^{13}$ is formed centrally to constitute a closure $c^8$ for the passage $c^6$ when said valve plug is depressed. By reason of the tapered form of the valve plug when said plug is depressed it leaves its seat so that at this time air may pass through the upper end of the casing around the plug and into the radiator and thereby decrease the radiating capacity of the radiator. When the valve plug is thus depressed the opening $c^6$ at the lower end of the casing is closed by means of the projection $c^8$ on the tapered valve plug $C^{13}$, so that at this time air cannot pass through the valve into the pipe $C^6$. Said valve is depressed by means of a lever $C^{15}$ which is hinged to one side of a thimble $C^{16}$ which loosely surrounds the upper angular end of the valve plug and is located within the upper end of the valve casing, and said lever is adapted to bear downwardly between its ends on a lug or extension $c^9$ projecting upwardly from the angular end of said valve plug $C^{13}$ through an opening in the top wall of said thimble. The lever $C^{15}$ is provided with an extension or lug $c^{10}$ which is adapted for interlocking connection with the upper flanged wall of said thimble $C^{16}$, whereby the thimble and lug may be turned or rotated by said lever, and by rotation of said plug the radiator may be cut off from the air valve chamber.

The air valve $C^{10}$ associated with the feed and return fitting $C^3$ of the upper radiator is not designed for controlling the entrance of air to the radiator, but is constructed merely to provide regulable discharge for the air from the radiator. Said valve (Fig. 20) consists of a casing $C^{17}$ provided with a branch $C^{18}$ which is exteriorly screw-threaded to enter a screw-threaded opening in the fitting $C^3$. The bore of said branch $C^{18}$ is adapted to be opened and closed by means of a tapered valve $c^{11}$ located within the chamber in axial alinement with the bore of said branch and provided with an exteriorly screw-threaded head $c^{12}$ which engages interior screw-threads in the casing. Said casing is closed at its outer ends by means of a cap $C^{19}$. The casing is provided with a branch $C^{20}$ adapted for connection with the air pipe $C^5$.

The seal fitting G, through which steam is drawn from the pipe $D^1$ and water of condensation returned thereto, is shown in detail in Fig. 19, and comprises a chambered casting $G^1$ provided at one side of its center with upper and lower alined openings with which the parts or sections of the pipe $D^1$ have screw-threaded connection. At one side of the upper opening is a second opening adapted to receive one of the water of condensation pipes $C^4$ and depending from said opening into the casting is a short tapered annular flange $G^2$. The side of said chambered casting which contains said flange $G^2$ is made deeper than the other part thereof to constitute a trap chamber $G^3$ which is adapted to be filled to the level of an upwardly extending weir or lip $g$ located between said chamber and the part of the fitting with which the pipe $D^1$ has communication. The fitting is provided at one side with a lateral opening from which leads one of the branch pipes $c$, for conducting steam to the radiator. The deep trap chamber $G^3$ combined with the depending flange $G^2$ constitutes, when the chamber is filled with water, a seal which prevents the escape of steam from the pipe $C^4$ into the fitting, or vice versa, and at the same time permits the condensed water to pass freely from the pipe $C^4$ through the fitting into the pipe $D^1$.

In Fig. 21 I have shown an arrangement of the steam feed and water of condensation discharge devices of a radiator which is located below the level of the central collecting tank or return pump of the system. The radiator $C^2$ of this arrangement is provided with a feed and return fitting K into which a branch pipe $c$ from the next superjacent seal fitting G enters and said pipe $c$ communicates with the fitting through a special terminal fitting or feed bushing $k$. Said fitting K is provided at its side remote from the radiator with a lateral water outlet opening and between said opening and the bushing with an upturned flange constituting a weir $k^1$ which determines the level of the water in the fitting and the associated radiator. The lateral opening in said fitting communicates by a short tube $k^2$ with a screen chamber L provided with a screen $L^1$ extending transversely thereacross, whereby foreign matters carried in suspension in the water passing through said chamber are removed therefrom. Said screen chamber is provided with an upper removable wall $l$ whereby the screen may be removed and cleansed as desired.

The screen chamber is connected by a tube $l^1$ with a float trap indicated as a whole by the reference letter M, and made generally like the float trap shown in my U. S. Letters Patent, No. 791,811, granted on the 6th day of June, 1905. The trap herein shown, however, is changed in the details of its construction to adapt itself to the use herein illustrated. Said trap consists of a casing having a vertically elongated, central float chamber $M^1$ and provided with an inlet branch $m$ communicating with the passage from the screen or strainer chamber L. Said inlet branch communicates by means of a vertical passage $M^2$ in the casing with the upper end of the float chamber and the passage $M^2$ is provided at its lower end with a depending weir $m^1$ located with its lower edge below the upper edge of the weir $k^1$ of the fitting K, and below the line of flotation of the float. Said casing is provided with an outlet branch $M^3$ which communicates with a pipe $M^{40}$ leading to the return pipe $C^7$. The discharge passage $M^3$ is separated from the float chamber by the bottom wall $m^2$ of the latter, and said bottom wall is provided with a port which is closed by a valve $m^3$ which is attached to or made a part of a float $M^4$ contained within the float chamber. The upper part of the float chamber communicates by means of a passage $m^4$ with an air valve $M^5$, made substantially like the air valve shown in Fig. 17, and the discharge passage $m^5$ of said air valve communicates with an air discharge passage $M^6$ formed in the side of the casing adjacent to the float chamber. Said air discharge passage $M^6$ communicates with the discharge passage $M^3$ of the trap through the medium of a port $m^6$ which is adapted to be closed by means of a closure $m^7$ attached to the free end of a thermostatic member $m^8$ located in the passage $M^6$. Said thermostatic member is so arranged that when cold it holds the closure away from the port $m^6$ and when heated, as by the impingement of steam thereagainst it is moved towards and closes or partially closes said port. $M^7$ designates a valve which closes a by-pass between the lower end of the inlet passage $M^2$ of the trap casing and the outlet passage $M^3$ thereof, so as to drain the water from the lower end of said passage $M^2$. Said valve is provided with a screw-threaded stem $m^9$ which extends outwardly through the casing. The stem $m^9$ is continued to a point inside the valve closure and is provided with an inclined terminal $m^{10}$ which is adapted to engage a stem $m^{11}$ depending from the valve $m^3$ carried by the float, so that when the by-pass valve $M^7$ is moved away from its seat to open the by-pass, said inclined end $m^{10}$ acts upon the stem $m^{11}$ to raise the float and permit the water to be discharged from the passage $M^2$. $M^8$ designates an air pipe which enters at one end of the upper end of said passage $M^2$ and is connected at its other end with the base of the radiator on the side thereof remote from the steam fitting K, and the terminal end $m^{12}$ of said pipe terminates just above the water line in the radiator.

The operation of the arrangement shown in Fig. 21 is as follows:—Assuming the radiator to be cold and filled with air, when steam is to be admitted to the radiator, the exhausting device is operated to exhaust air from the radiator, the air passing from the radiator through the pipe $M^8$ to the float chamber and from the float chamber through the passages $m^4$ $m^5$ of the air valve, and thence through the air passage $M^6$ and port $m^6$ to the discharge side of said trap. When the radiator is discharged of its air and the steam passes into the trap and impinged against the thermostatic member $m^8$ in the air discharge passage, it heats said member and moves the valve $m^7$ in position to partially close the port $m^6$. It will be understood that the air valve comprising the parts $m^6$ and $m^7$ is not, under ordinary circumstances, entirely closed so that the exhausting device acting to produce a slight contact vacuum in the float chamber of the trap. Said vacuum acts, after the terminal end $m^{12}$ of the pipe $M^8$ is sealed by the water accumulating in the base of the radiator from the condensation of the steam therein to draw the water upwardly through the passage $M^2$; and, by reason of the connection of said passage with the pipe $M^8$ upwardly through the end of the latter pipe connected with the radiator to the same level, until the water overflows into the float chamber. After sufficient water has overflowed into the float chamber to raise the float, such water escapes and the full force of the exhausting device is exerted to draw the water from the radiator and from the passage $M^2$ of the trap until the terminal end of the pipe $M^8$ is unsealed, after which the water in the passage $M^2$ of the trap settles back into the lower end thereof, and after the water has subsided in the float chamber sufficiently to permit the float to drop, said float falls and closes the opening between the float chamber and the outlet branch of the trap. It will be understood that the vacuum existing in the pipe $M^{40}$ is sufficient to lift the water from the trap M and carry it to the pump H from which it is lifted to the condenser in the manner before described. Desirably, the exhaust pipes of all of the engines $H^2$, J and I are connected, through a pipe $B^{40}$, with the exhaust pipe $B^1$ of the main engine B.

Referring now to the thermostatic controlling devices shown in Figs. 22 to 25, inclusive, said parts are made as follows:— The letter N designates as a whole a thermostat which is connected with the radiator $C^{25}$ through a shifting valve O communicating with the radiator at its side remote from the steam inlet thereof. The shifting valve comprises a casting containing a chamber $O^1$ divided into two parts by a diaphragm $O^2$. One side of the diaphragm chamber communicates with the thermostat through a pipe $o$ and the other side communicates through a pipe $o^1$ with the air inlet $D^{20}$ of the exhausting apparatus. The passage leading from the diaphragm chamber to said pipe $o^1$ is closed by a valve $o^2$ which is movable with the diaphragm and is normally held away from its seat by a spiral spring $o^3$ surrounding a guide flange for said valve and interposed between the lower wall of the chamber and a head $o^4$ on the upper end of the valve stem. $O^3$ is a tubular branch made integral with said casing and connected with the radiator on the side thereof remote from the steam inlet and communicating through a port $o^5$ (see dotted lines in Fig. 27) with the lower side of the diaphragm chamber or that which communicates with the air pipe $o^1$. Said port $o^5$ is controlled by a valve which is affixed to a thermostatic bar $o^{21}$ contained in the bore of the branch $O^3$, the bar acting to close the valve when heated. $O^4$ is a second branch which communicates through a pipe $o^6$ with the side of the radiator remote from the shifting valve. Said second branch $O^4$ communicates by a passage $o^{22}$ with the upper part of the diaphragm chamber or the side thereof which communicates with the thermostat. The air pipe $o^6$ is provided with a throttle valve $o^7$.

The thermostat N (Fig. 23) is made as follows: $N^1$ (Figs. 24 and 25) designates a frame provided with an opening which receives the upper end of the pipe $o$ leading from the shifting valve. At the inner side of said opening is located a nipple $n$ the inner end of which is adapted to be closed by a valve operated by the vertical arm of an L-shaped lever $N^3$ which is pivoted at its angle to a pin $n^2$. The valve proper is formed on the end of a spring strip $N^{23}$ attached to the frame in rear of the lever $N^3$ and carrying at its upper end in line with the nipple a yielding body $N^{24}$ of cork, or the like which constitutes the valve closure. The strip is folded around the body of cork as shown in Fig. 25 and the strip is provided on the side thereof adjacent to the nipple with an opening through which extends a nipple forming a valve seat $N^{25}$ of the nipple whereby said nipple bears directly against the yielding body $N^{24}$. When the valve is pressed against the nipple, the nipple is embedded into the yielding body $N^{24}$ until the strip strikes the larger part of the nipple, thus constituting a double closure. Said valve is held against its seat by means of a spring $N^4$ which is interposed between a horizontal arm $N^{20}$ on the lower part of the frame $N^1$ and the horizontal arm of the lever $N^3$. An adjusting screw $N^5$ extending through and having screw-threaded engagement with said arm $N^{20}$ adjusts the tension of said spring. The spring is opposed by a thermostatic device which tends to open the valve and which is made as follows: $N^6$ designates a stem which extends through a horizontal bearing arm $N^{21}$ of the frame $N^1$ and bears downward on the horizontal arm of said lever $N^3$. The upper end of said stem is rigidly connected with the lower one of a series of inter-communicating expansible and contractible chambers $N^7$ which are interposed between said stem and a bracket or arm $N^8$ of the frame $N^1$. Said chambers $N^7$ are filled with a liquid having a low boiling temperature and the chambers are so connected that when the contained liquid becomes heated the series of chambers become vertically lengthened and exert pressure, through the stem $N^6$, on said lever $N^3$ tending to open said air valve and permit air at atmospheric pressure to pass into and through the pipe $o$ into the upper side of the diaphragm chamber of the shifting valve. The parts described are inclosed by a suitably shaped casing $N^9$. The tension exerted by said thermostatic device on said valve lever $N^3$ may be varied by the following devices. The stem $N^6$ which bears against the horizontal arm of said lever is made hollow at its upper end and is interiorly screw-threaded and is engaged by an exteriorly screw-threaded stem $N^{10}$ on the lowermost of the expansible and contractible chambers $N^7$. Connected non-rotatively to said upper tubular part of the stem is a pointer $N^{11}$ which extends outwardly through a horizontal slot in the casing. The casing below said slot is provided with a scale $N^{30}$ (Fig. 22) which coöperates with said lever to determine the pressure exerted by said thermostat which will open said air valve.

The operation of the thermostatically operable devices is as follows: The adjustment of the pointer $N^{11}$ and the spring $N^4$ determines at what temperature the air valve shall be opened. It is to be understood that thermostatic devices are operated to open the air valve at a selected temperature of the apartment containing the radiator so that when such temperature is reached the valve is opened, and air is admitted to the radiator for the purpose of limiting the radiating capacity of the radiator and thereby reducing the temperature of the apartment. When the radiator is cold the valve closure $o^2$ of the shifting valve is held open by its spring $o^3$ and the air valve of the thermostat is closed by the spring $N^4$. The passage between the branch $O^3$ and the lower side of the diaphragm chamber of the shifting valve is also open. When steam is to be admitted to the radiator the exhausting apparatus is in open communication with the radiator through the pipe $o^1$ the lower part of the shifting valve diaphragm chamber and the branch $O^3$, whereby, when said exhausting apparatus is set in motion, air is drawn from the radiator. The contents of the radiator is thus withdrawn from the radiator until steam is brought into impingement with the thermostatic bar $o^{21}$ of the shifting valve and actuates its valve closure to close the port or passage $o^5$ and thereby cut off communication between the radiator and exhausting apparatus until said thermostatic bar again becomes cooled. Thereafter the steam condenses in the radiator in the usual manner and heats the apartment containing said radiator. When the temperature of the apartment has reached that selected to open the air valve of the thermostat N air is admitted through the thermostatic air valve and passes through the pipe $o$ and the pipe $o^6$ into the radiator and limits its radiating capacity until the temperature of the apartment descends below such selected temperature for the actuation of the air valve of the thermostat, whereupon said air valve closes and no more air is admitted to the radiator. The air admitted to the radiator collects in the side thereof remote from its steam inlet and upon the collection of a sufficient body of air in this part of the radiator it becomes cool and acts upon the thermostatic bar $o^{21}$ to open the valve $o^5$ of the shifting valve and permit the exhausting device to withdraw the air from the radiator until the passage is again closed by the impingement thereagainst of steam from the radiator.

In the arrangement shown in Fig. 22, the steam is admitted from the steam pipe $D^{21}$ through a branch pipe $D^{22}$ and a check-valve $D^{23}$, into the side of the radiator remote from the air check valve O, and water of condensation is directed from the radiator to the pipe $D^2$ through a trap $D^{24}$. The check valve $D^{20}$ is shown in Fig. 23 and consists of a chambered casting $D^{25}$ provided with branches $d^{20}$ and $d^{21}$ which communicate, respectively, with the pipe $D^{22}$ and a pipe $d^{22}$ leading from the radiator. The branch $d^{20}$ is extended into the casting to constitute a cylindric flange $d^{23}$ on the upper end of which is formed a seat against which seats a check-valve closure $D^{26}$. The check valve closure is provided in its upper side with a chamber adapted to contain water and within which fits a piston $d^{25}$ formed on the lower end of a stem $d^{27}$ extending downwardly from the top of the valve casing or shell. The disk is provided at its margin with one or more notches $d^{35}$ whereby water may pass from the upper to the lower side of the piston and vice versa. The body of water in the chamber acts in connection with the piston as a governor to control the rise and fall of the valve.

The general operation of the system herein described may be stated as follows: It will be understood that steam may be and preferably is used in the heating system described under as great a vacuum as may be economically operated, while providing for the return of the water of condensation and the exhaust of steam and air from the heating devices. In starting the system, the exhausting device, to wit,—the pump H is set in operation to exhaust air from the heating space and the exhaust steam from the engine B is directed to the condenser and therefrom to the heating space. When the steam is first directed into the system it will be understood that the closure of the valve $E^2$ is open because of the fact that the column of water in the tank $E^{11}$ is shorter than the column in the tank $E^{12}$ and its connecting pipe, so that as soon as the pump J is set in operation to force water through the closed condensing water circuit and thereby supply water to the tank $J^6$ to be thereafter directed through the pipe $E^1$ to the condenser, said water will flow freely into the condenser. The water is thus freely delivered to the condenser until such time as the condensation of steam therein reduces the back pressure in the engine and the pressure in the heating system after which the vacuum in the system acts through the column of water in the tank $E^{12}$ and its connecting pipe to close or partially close the valve $E^2$. Thereafter the supply of the condensing liquid to the condenser is regulated by the vacuum on the feed side of the heating system in the manner before described. The reduction of the back pressure, by reason of the condensation of the steam in the condenser, at the beginning of the operation of the apparatus, reduces the supply of exhaust steam so that the work performed by the engine is reduced to the extent of the reduction of the back pressure, whereby the volume of live steam and consequently the exhaust steam is reduced, whereby, eventually, all or practically all of the exhaust steam from the engine will be used in the heating system. Upon a variation of the load of the heating system or of the engine, the back pressure on the engine will be varied. If such back pressure be increased it will operate through the valve $E^2$ to increase the supply of the condensing agent to the condenser and thereby condense the surplus steam. If on the other hand the back pressure be decreased by reason of the decreased load on the engine, or by reason of a sudden increased consumption of steam, the supply of exhaust steam may not be sufficient to supply the heating system, in which event live steam will be introduced through the valve $A^2$. In the event of loss of back pressure the supply of the condensing agent may be entirely cut off. If such failure of exhaust steam to meet the requirements be but momentary, due to a momentary decrease of the engine load, it will be observed that the decrease of back pressure, due to such reduced load, will act to generate steam from the water collected in the lower end of the condenser tank which steam will be utilized for supplying or replacing the momentary deficiency of steam.

It will be understood that in first starting the system in operation, the amount of vacuum under which the system is to operate will be regulated by the height of the liquid column in the tank $E^{11}$ and water is introduced or discharged from said tank through the pipe $e^{16}$. Such working pressure of the system may be varied at the time the system is in operation if desired, and the operation of the pressure on the valve $E^2$ is such that the parts will readjust themselves to the new working pressure. Regardless of the actual or absolute pressure under which the system is operating, it will be observed that the pressure regulator $H^3$, which controls the supply of live steam to the engine $H^2$ of the exhausting pump, maintains a constant difference of pressure between the feed and exhaust or return sides of the system, so that such exhausting apparatus operates at all times to produce the required and a uniform delivery of steam to the apparatus, and exhaustion of air therefrom.

It will be observed that the body of water collected in the condenser tank E is always maintained at the same temperature as the steam in the heating system, which is a relatively high temperature, so that the feed water for the boiler A supplied thereto through the pump I is suitably heated. It will be observed that all of the air introduced into the system for regulating purposes is discharged therefrom through the valved discharge pipe of the tank $H^1$ into which the water and air is discharged from the exhausting pump H.

I claim as my invention:—

1. In a combined steam power and heating plant, a boiler, an engine, and two systems of steam condensation receiving exhaust steam from said engine, one comprising a space heating system and the other controlled by the pressure in the space heating system to condense the steam not used in the space heating system and operating to maintain a substantially equable pressure in said space heating system.

2. In a combined steam power and heating plant, a boiler, an engine, and two systems of steam condensation receiving exhaust steam from the engine, one comprising a space heating system, and means controlled by the steam consumption in the space heating system for regulating the supply of a condensing agent to the other condensing system.

3. In a combined steam power and heating plant, a boiler, an engine, a heating apparatus which receives exhaust steam from the engine, a condenser interposed between the engine and heating apparatus, and automatic means for supplying a condensing agent to the condenser.

4. In a combined steam power and heating plant, a boiler, an engine, a heating apparatus receiving exhaust steam from said engine, a condenser interposed between the engine and heating apparatus and in constant open communication with the heating apparatus and means controlled by the consumption of steam in said heating apparatus for regulating the quantity of steam condensed in the condenser.

5. In a combined steam power and heating plant, a boiler, an engine, a heating apparatus which receives exhaust steam from the engine, a condenser interposed between the engine and heating apparatus, automatic means for supplying a condensing agent to the condenser, and means controlled by the condition of pressure in the heating apparatus for regulating the supply of the condensing agent to the condenser.

6. In a combined power and steam heating plant, a boiler, an engine receiving steam from said boiler, a steam heating apparatus receiving steam from said engine, a condenser interposed between the heating apparatus and the engine and condensing steam not used in the apparatus, and means controlled by the pressure on the feed side of the heating apparatus for regulating the supply of the condensing agent to the condenser.

7. In a combined power and steam heating plant, a boiler, an engine receiving steam from said boiler, a steam heating apparatus receiving steam from said engine, a condenser interposed between the heating apparatus and the engine and condensing steam not used in the heating apparatus, means controlled by the pressure on the feed side of the heating apparatus for regulating the supply of the condensing agent to the condenser, and means for varying the pressure on the feed side of the heating apparatus.

8. In a combined steam power and heating plant, a boiler, an engine receiving steam from said boiler, a steam heating apparatus receiving exhaust steam from the engine, a condenser interposed between the heating apparatus and engine and condensing steam not used in said apparatus, a pipe for delivering the condensing agent to the condenser, a valve in said pipe acted upon at its opposite sides by two liquid columns, one of said liquid columns being subject to the condition of pressure in the feed side of the heating system.

9. In a combined steam power and heating plant, a boiler, an engine receiving steam from said boiler, a steam heating apparatus receiving exhaust steam from the engine, a condenser interposed between the heating apparatus and engine and condensing steam not used in said apparatus, a pipe for delivering the condensing agent to the condenser, a valve in said pipe acted upon at its opposite sides by two liquid columns, one of said liquid columns being subject to the pressure in the feed side of the heating apparatus, and means for varying the height of one of said liquid columns.

10. In a combined power and steam heating system, an engine, a steam heating apparatus receiving steam from said engine, a condenser interposed between the engine and the heating apparatus, and means for maintaining a predetermined condition of pressure in said condensing and heating apparatus by the condensation of such portion of steam in the condenser as is not required for use in said heating apparatus.

11. In a combined power and steam heating system, an engine, a steam heating apparatus receiving steam from said engine, a condenser interposed between the engine and the heating apparatus, and means for maintaining a predetermined condition of pressure in said condensing and heating apparatus by the condensation of such portions of steam in the condenser as is not required for use in said heating apparatus, embracing automatic means for supplying a condensing agent to said condenser.

12. In a steam power and heating plant, an engine, a steam heating apparatus receiving steam from the engine, a condenser interposed between the heating apparatus and engine, automatic means for supplying a condensing agent to said condenser, and a closed circuit through which the condensing agent is circulated to cool the same and for returning it back to the condenser.

13. In a steam power and heating plant, an engine, a steam heating apparatus receiving steam from the engine, a condenser interposed between the heating apparatus and engine, automatic means for supplying a condensing liquid to said condenser, and a closed circuit embracing a pump for withdrawing the heated condensing liquid from the condenser, circulating it through said closed circuit and returning it to the condenser when cooled.

14. In a steam power and heating plant, an engine, a steam heating apparatus receiving steam from said engine, a condenser interposed between said heating apparatus and engine, a closed circuit for withdrawing the heated condensing agent from and returning it to the condenser, embracing a pump for withdrawing the said agent from the condenser and circulating it through said circuit, said closed circuit embracing a closed chamber at the other side of said closed circuit which is in open communication with the return side of the system, and a pipe leading from said closed chamber and discharging into the condenser.

15. In a steam power and heating plant, an engine, a steam heating apparatus receiving steam from the engine, a condenser interposed between the engine and the steam heating apparatus for condensing steam not used in the apparatus, automatic means controlled by the condition of pressure on the feed side of the heating apparatus for regulating the supply of a condensing liquid to the condenser, and a water collecting apparatus for withdrawing the water of condensation from the heating apparatus, said water collecting apparatus discharging the water of condensation into said condenser.

16. In a steam power and heating plant, an engine, a steam heating apparatus receiving steam from the engine, a condenser interposed between the engine and the steam heating apparatus for condensing steam not used in the apparatus, automatic means controlled by the condition of pressure on the feed side of the heating apparatus for regulating the supply of a condensing liquid to the condenser, a water collecting apparatus for withdrawing the water of condensation from the heating apparatus, said water collecting apparatus discharging the water of condensation into the condenser, and means for cooling the condensing agent comprising a closed circuit connected at one end with the lower part of the condenser, and at its other end with the upper part thereof, and a pump for forcing the liquid through said circuit.

17. In a steam power and heating plant, an engine, a steam heating apparatus receiving steam from the engine, a condenser interposed between said steam heating apparatus and engine, automatic means for supplying a condensing agent to the condenser whereby is condensed the steam not used in the steam heating apparatus, and a grease catcher and dehydrator interposed between said heating apparatus and engine.

18. In a combined steam power and heating plant, an engine, a steam heating apparatus receiving steam from the engine, a condenser interposed between said steam heating apparatus and the engine, automatic means for supplying a condensing agent to the condenser whereby is condensed the steam not used in the steam heating apparatus, and an air check valve in the exhaust pipe outside of its connection with the condenser and constructed to open to permit the escape of exhaust steam from said exhaust pipe upon the excess of a predetermined back pressure in said pipe and to close to prevent the admission of air to the apparatus through said exhaust pipe.

19. In a power and steam heating plant, a steam generator, an engine receiving steam from said generator, a steam heating apparatus, a condenser interposed between the exhaust pipe of said engine and said steam heating apparatus, automatic means for supplying a condensing agent to said condenser, a live steam pipe delivering steam from the generator to said steam heating apparatus, and a pressure regulator controlled by the pressure in the feed side of the heating apparatus for delivering live steam to the heating apparatus when the supply of exhaust steam is insufficient to fill the heating apparatus.

20. A combined power and steam heating plant comprising an engine, a steam heating apparatus receiving steam from the exhaust pipe of said engine, a condenser located between said exhaust pipe and said steam heating apparatus, automatic means for supplying a condensing agent to said condenser, an exhaust pump for withdrawing the water of condensation and air from said steam heating apparatus, an engine for operating said exhaust pump, a hot water pump for withdrawing the condensing agent from said condenser, and an engine for operating said hot water pump, the exhaust pipes of the engine for the exhaust pump and the engine for said hot water pump being connected with the exhaust pipe of the main engine.

In testimony, that I claim the foregoing as my invention I affix my signature in presence of two witnesses, this 21st day of November A. D. 1903.

EUGENE F. OSBORNE.

Witnesses:
C. CLARENCE POOLE,
GERTRUDE J. BRYCE.